(12) United States Patent
Shinohara et al.

(10) Patent No.: US 6,742,422 B1
(45) Date of Patent: Jun. 1, 2004

(54) NUMERICALLY CONTROLLED LATHE AND METHOD OF CUTTING WORKPIECE ON THE NUMERICALLY CONTROLLED LATHE

(75) Inventors: Hiroshi Shinohara, Tokorozawa (JP); Yuji Miyazaki, Tokorozawa (JP); Atsushi Aoyagi, Tokorozawa (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 10/380,104

(22) PCT Filed: Sep. 22, 2000

(86) PCT No.: PCT/JP00/06495

§ 371 (c)(1), (2), (4) Date: Mar. 11, 2003

(87) PCT Pub. No.: WO02/24385

PCT Pub. Date: Mar. 28, 2002

(51) Int. Cl.[7] .................................................. B23B 3/30
(52) U.S. Cl. ............................... 82/1.11; 82/47; 82/118; 82/129
(58) Field of Search ........................... 82/1.11, 129, 47, 82/118, 121, 158, 138; 29/27 C

(56) References Cited

U.S. PATENT DOCUMENTS 3,878,742 A * 4/1975 Lahm .......................... 82/1.11
5,117,544 A * 6/1992 Kousaku et al. ............. 29/27 C
5,313,861 A * 5/1994 Ikeda .......................... 82/1.11
6,024,001 A * 2/2000 Oya ............................ 82/1.11

FOREIGN PATENT DOCUMENTS

| JP | 06-000703 | 1/1994 |
| JP | 10-501758 | 1/1994 |
| JP | 07-185901 | 7/1995 |
| JP | 09-323201 | 12/1997 |
| JP | 10-315005 | 12/1998 |

* cited by examiner

Primary Examiner—Willmon Fridie, Jr.
(74) Attorney, Agent, or Firm—Kanesaka & Takeuchi

(57) ABSTRACT

There is provided a numerically controlled lathe capable of simultaneously performing various kinds of machining to a plurality of workpieces.

An NC lathe according to the present invention has a first main shaft 121 and a second main shaft, a first tool rest 160 to which a tool T1 and/or a tool T2 used to machine workpieces W1 and W2 grasped by these main shafts are attached, and a second tool rest 180 to which a tool T3 and/or a tool T4 used to machine the workpieces W1 and W2 are attached. The first tool rest 160, the second tool rest 180 and the second head stock 130 can move in the direction of a Z axis and the direction of an X axis without restraint. A numerical control device 191 controls movement of the first tool rest 160, the second tool rest 180 and the second head stock 130 in the direction of the X axis and movement of the same in the direction of the Z axis. As a result, a plurality of types of machining can be simultaneously applied to the two workpieces by using at least three tools in the tools T1 to T4.

7 Claims, 13 Drawing Sheets

NUMERICALLY CONTROLLED LATHE AND METHOD OF CUTTING WORKPIECE ON THE NUMERICALLY CONTROLLED LATHE

TECHNICAL FIELD

The present invention relates to a numerically controlled lathe which has two opposed head stocks, main shafts respectively supported by the two head stocks, and two tool rests each having attached thereto a tool used to machine a workpiece grasped by each of the main shafts, and can simultaneously machine two workpieces grasped by the respective main shafts on the two head stocks, and to a method of cutting a workpiece on this numerically controlled latch.

BACKGROUND ART

A numerically controlled lathe (which will be referred to as an NC lathe hereinafter) which has two opposed head stocks and tool rests and can simultaneously machine two workpieces grasped by main shafts of the two head stocks by using a tool attached to each of the tool rests is known from, for example, Japanese Patent Application Laid-open No. 501758/1998 and others.

FIG. 13 is a plane view illustrating a schematic structure of the NC lathe disclosed in Japanese Patent Application Laid-open No. 501758/1998.

A first head stock 220 and a second head stock 230 are oppositely arranged on a bed 210 of an NC lathe 200. The first head stock 220 and the second head stock 230 respectively rotatably support main shafts 221 and 231 parallel to a Z axis of the NC lathe 200. These main shafts 221 and 231 are arranged so as to be eccentric in the direction of an X axis. A non-illustrated chuck is provided at an end of each of the main shafts 221 and 231, and the chucks grasp workpieces W1 and W2.

The first head stock 220 is fixed to the bed 210. A guide rail 240 extending in the direction of a Z1 axial line parallel to the Z axis of the NC lathe 200 is provided to the bed 210. A saddle 250 is mounted on the guide rail 240, and the saddle 250 moves forward and backward in the direction of the Z1 axis while being guided by the guide rail 240 by drive of a non-illustrated drive mechanism including a servo motor and others.

A guide rail 270 is provided on the saddle 250 in the direction parallel to the X axis. A carriage 255 which reciprocates along the guide rail 270 is mounted on the guide rail 270. This carriage 255 moves in the direction of an X1 axis parallel to the X axis by drive of the non-illustrated drive mechanism including a servo motor and others. A first tool rest 260 and the second head stock 230 are mounted on the carriage 255 and move together with the carriage 255 in the direction of the X1 axis.

The first tool rest 260 includes a turret face plate 261 capable of sectional rotation on one side thereof. To this turret face plate 261 are attached a plurality of tools T1 used to machine the workpiece W1 grasped by the main shaft 221 of the first head stock 220. Further, the tool T1 is positioned with respect to the workpiece W1 and machines the workpiece W1 while moving the direction of the Z1 axis by a combination of movement of the saddle 250 in the direction of the Z1 axis and movement of the first tool rest 260 in the direction of the X1 axis.

A second tool rest 280 is provided so as to be opposed to the main shaft 231 of the second head rest 230. A turret face plate 280 capable of sectional rotation is provided to the second tool rest 280 on one side thereof. To the turret face plate 281 are attached a plurality of tools T2 used to machine the workpiece W2 grasped by the main shaft 231 of the second head stock 230. The second tool rest 280 can freely move on the bed 210 in the direction of the X2 axis along a guide rail 282 provided in the direction of an X2 axis parallel to the X axis of the NC lathe 200.

According to such an NC lathe 200, since the first tool rest 260 and the second head stock 230 are provided on the common saddle 250 and the carriage 255, movement of the tool T1 in the direction of the Z1 axis relative to the workpiece W1 becomes movement of the tool T2 relative to the workpiece W2, and the same drilling or the like can be carried out with respect to the two workpieces W1 and W2 at the same time.

Furthermore, different kinds of machining can be performed to the workpieces W1 and W2 at the same time by adding a movement speed inherent to the direction of X2 axis to the tool T2 while moving the tool T2 such as a cutting tool in the direction of the X2 axis in synchronization of movement of the tool T1 in the direction of the X1 axis.

The above-described NC lathe 200 can perform the same kind or different kinds of machining to a plurality of workpieces W1 and W2 at the same time, but there are the following disadvantages.

That is, since movement speeds of the tool T1 and the tool T2 in the direction of the Z1 axis are determined by movement of the saddle 250 in the direction of the Z1 axis, types of machining to the workpieces W1 and W2 which can be performed at the same time are restricted.

It is an object of the present invention to provide an NC lathe which can perform various kinds of machining to a workpiece on the first main shaft side and a workpiece on the second main shaft side at the same time, and a method of cutting a workpiece on this NC lathe.

DISCLOSURE OF THE INVENTION

According to the present invention, there is provided a numerically controlled lathe having: a first head stock and a second head stock arranged so as to be opposed to each other; a first main shaft supported by the first head stock and a second main shaft supported by the second head stock; a tool rest including tools used to machine workpieces grasped by the first main shaft and the second main shaft; and a numerical control device which controls rotation of the first main shaft, rotation of the second main shaft and relative movement of the tool rest with respect to the first head stock or the second head stock, wherein the numerically controlled lathe comprises: a first tool rest to which one or both of a first tool used to machine the workpiece grasped by the first main shaft and a second tool used to machine the workpiece grasped by the second main shaft can be attached and can freely move in a direction of a Z1 axis parallel to a main shaft axial line of the first main shaft and a direction of an X1 axis orthogonal to the Z1 axis; a second head stock which can freely move in a direction of an X3 axis parallel to the X1 axis of the first tool rest and a direction of a Z3 axis parallel to the Z1 axis; and a second tool rest to which one or both of a third tool used to machine the workpiece grasped by the first main shaft and a fourth tool used to machine the workpiece grasped by the second main shaft can be attached and can freely move in a direction of a Z2 axis parallel to the main shaft axial line of the first main shaft and a direction of an X2 axis orthogonal to the Z2 axis.

In this numerically controlled lathe, there is provided a control device which includes a first control system which controls movement of the first tool rest in the direction of the X1 axis and movement of the same in the direction of the Z1 axis, a second control system which controls movement of the second head stock in the direction of the X3 axis and movement of the same in the direction of the Z3 axis and a third control system which controls movement of the second tool rest in the direction of the X2 axis and movement of the same in the direction of the Z2 axis, and it is good enough that the first control system, the second control system and the third control system perform superposition control of movement of a pair of the X1 axis and the X3 axis, superposition control of movement of a pair of the X3 axis and the X2 axis, superposition control of movement of a pair of the Z1 axis and the Z3 axis, and superposition control of movement of a pair of the Z3 axis and the Z2 axis in accordance with combinations of three tools from the tools T1 to T4 used to machine the workpiece W1 and the workpiece W2.

According to the present invention, there is provided a cutting method of using the numerically controlled lathe having the above structure, comprising the steps of: enabling one or both of a first tool used to machine a workpiece grasped by the first main shaft and a second tool used to machine a workpiece grasped by the second main shaft to be attached to the first tool rest; enabling one or both of a third tool used to machine the workpiece grasped by the first main shaft and a fourth tool used to machine the workpiece grasped by the second main shaft to be attached to the second tool rest; superposing movement of the second headstock in the direction of the X3 axis or the direction of the Z3 axis on movement of the first tool rest in the direction of the X1 axis and movement of the same in the direction of the Z1 axis; superposing movement of the second tool rest in the direction of the X2 axis or the direction of the Z2 axis on movement of the second head stock in the direction of the X3 axis or movement of the same in the direction of the Z3 axis; and simultaneously machining the workpieces grasped by the first main shaft and the second main shaft by using the tools attached to the first tool rest and the second tool rest, when the first tool and the second tool are attached to the first tool rest and the fourth tool is attached to the second tool rest.

According to the present invention, the workpiece on the first head stock is machined by using the first tool while the first tool rest is moving in the direction of the X1 axis and the direction of the Z1 axis. Since the second head stock can move in the same direction as the first tool rest, relative movement of the second tool attached to the first tool rest and the workpiece on the second head stock can be set to 0 by synchronizing the second head stock to movement of the first tool rest.

Moreover, in order to obtain movement required for machining the workpiece W2 using the second tool, movement of the second head stock in the direction of the X3 axis is superposed on movement of the first tool rest in the direction of the X1 axis, and movement of the second head stock in the direction of the Z3 axis is superposed on movement of the first tool rest in the direction of the Z1 axis. As a result, final movement of the second head stock can be determined.

Likewise, since the second tool rest can move in the same direction as the second head stock, relative movement of the fourth tool attached to the second tool rest and the workpiece on the second head stock can be set to 0 by synchronizing the second tool rest with movement of the second head stock.

In addition, in order to obtain movement required for machining the workpiece using the fourth tool, movement of the second tool rest in the direction of the X2 axis is superposed on movement of the second head stock in the direction of the X3 axis, and movement of the second tool rest in the direction of the Z2 axis is superposed on movement of the second head stock in the direction of the Z3 axis, thereby determining final movement of the second tool rest.

In this manner, the workpiece of the first main shaft and the workpiece of the second main shaft can be simultaneously machined by using the tool attached to the first tool rest and the tool attached to the second tool rest. The machining of the workpiece on the first main shaft side may be the same as that of the workpiece on the second main shaft side, but they may be different from each other.

BEST MODE FOR CARRYING OUT THE INVENTION

Preferred embodiments according to the present invention will now be described in detail hereinafter with reference to the accompanying drawings.

A schematic structure of an NC lathe according to the present invention will be first explained with reference to FIGS. 1 and 2.

Figure 1:
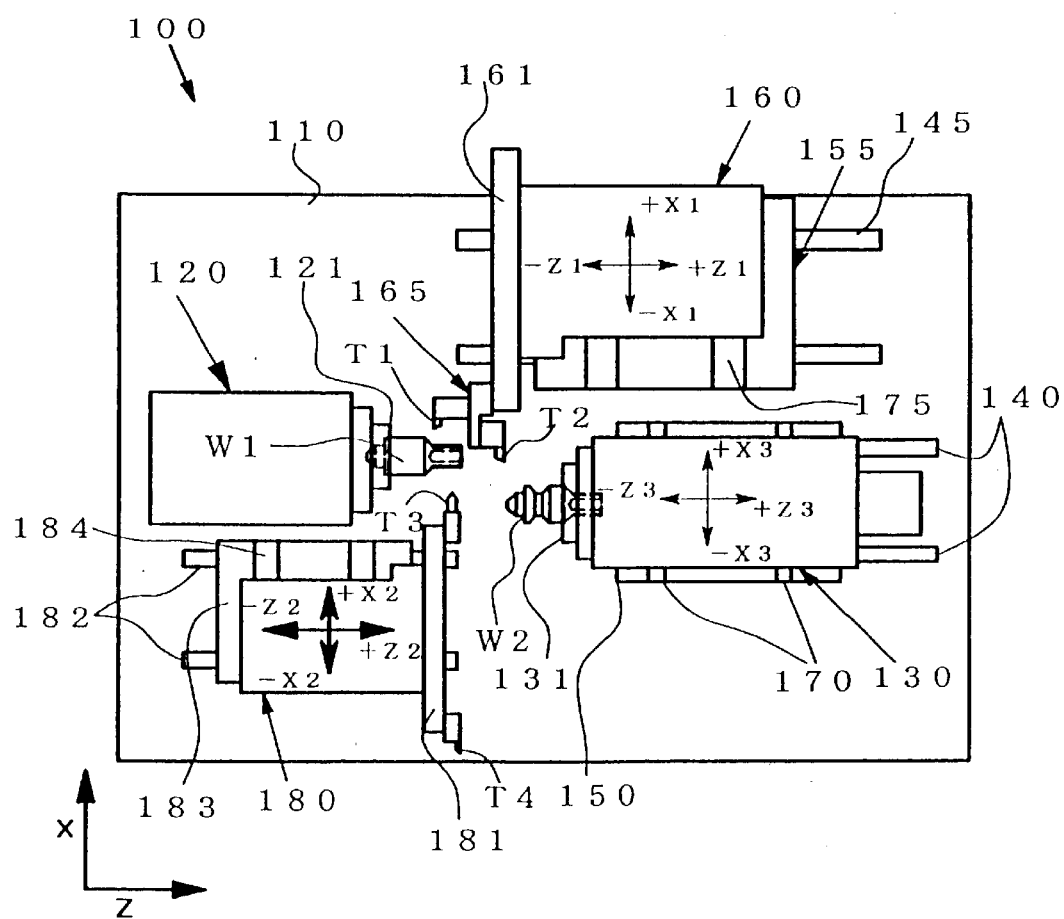
FIG. 1 is a plane view for illustrating a schematic structure of an NC lathe according to the present invention.
Figure 2:
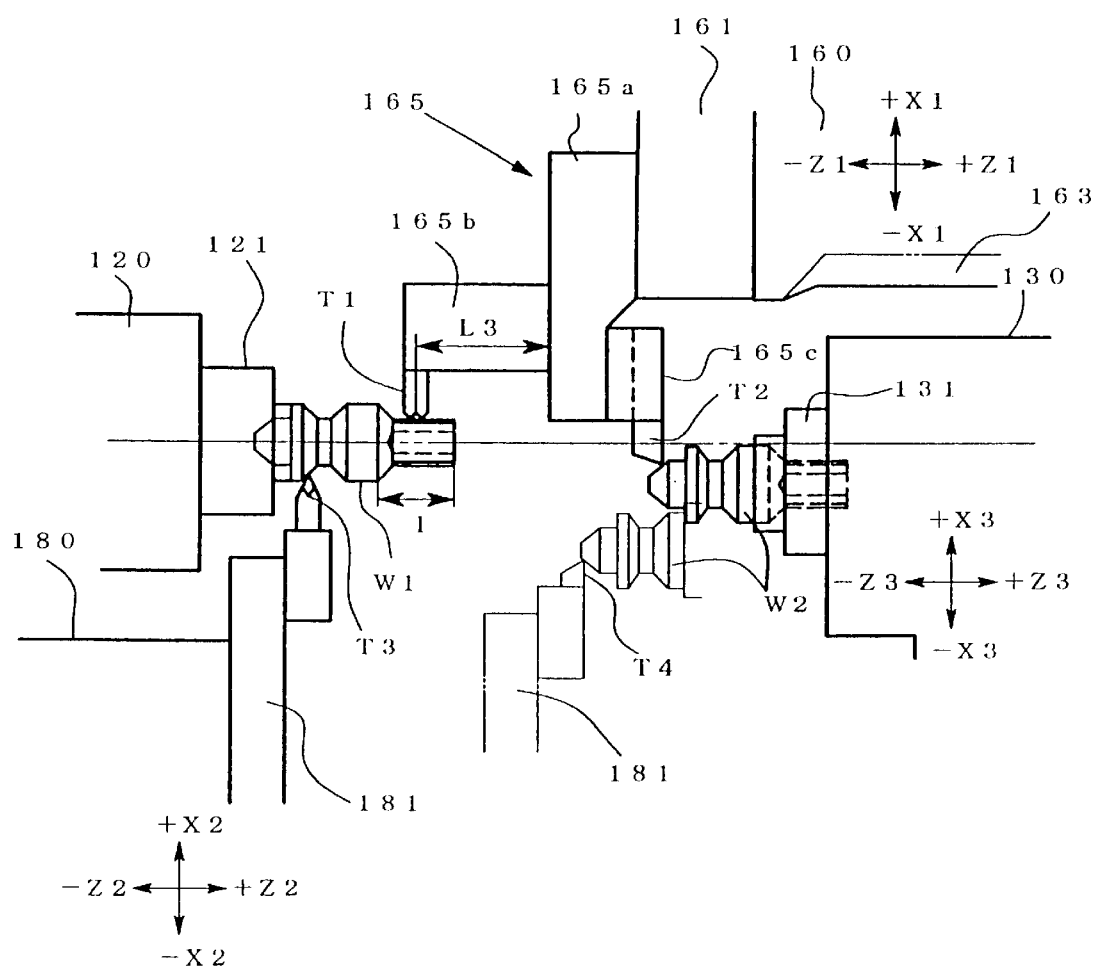
FIG. 2 is a partially enlarged view of the NC lathe of FIG. 1.

FIG. 1 concerns a first embodiment of the NC lathe according to the present invention and is a plane view for illustrating a schematic structure thereof, and FIG. 2 is a partially enlarged view of the NC lathe of FIG. 1.

A first head stock 120 and a second head stock 130 are arranged so as to be opposed to each other on a bed 110 of an NC lathe 100. The first head stock 120 rotatably supports a main shaft 121, and the second head stock 130 rotatably supports a second main shaft 131. A non-illustrated chuck is provided to an end of each of the first main shaft 121 and the second main shaft 131, and workpieces W1 and W2 can be grasped by using the chucks.

In this embodiment, the first head stock 120 is fixed to the bed 110. A guide rail 140 is provided to the bed 110 in the direction of a Z3 axis parallel to a Z axis. A saddle 150 is mounted on the guide rail 140. This saddle 150 moves forward and backward in the direction of a Z3 axis while being guided by the guide rail 140 by drive of a non-illustrated drive mechanism constituted by a combination of a linear motor or a servo motor and a lead screw and others.

A guide rail 170 is provided on the saddle 150 in the direction of an X3 axis orthogonal to the Z3 axis. The second head stock 130 is mounted on the guide rail 170 and moves forward and backward in the direction of the X3 axis while being guided by the guide rail 170 by drive of a non-illustrated drive mechanism having the structure similar to the above (a drive mechanism having the similar structure will be simply referred to as a "drive mechanism" hereinafter).

A guide rail 145 is provided to the bed 110 in the direction of a Z1 axis parallel to the Z axis. A saddle 155 is mounted on the guide rail 145. This saddle 155 moves forward and backward in the direction of the Z1 axis while being guided by the guide rail 145 by drive of the non-illustrated drive mechanism.

A guide rail 175 is provided on the top surface of the saddle 155 in the direction of the X1 axis orthogonal to the Z1 axis. A first tool rest 160 is mounted on the guide rail 175 and moves forward and backward in the direction of the X1 axis while being guided by the guide rail 175 by drive of the non-illustrated drive mechanism.

The first tool rest 160 includes a turret face plate 161 capable of sectional rotation on the first head stock 120 side. To this turret face plate are attached a plurality of tools T1 used to machine a workpiece W1 grasped by the first main shaft 121. The tool T1 is positioned to a predetermined position with respect to the workpiece W1 and machines the workpiece W1 by movement of the first tool rest 160 in the direction of the X1 axis and movement of the saddle 155 in the direction of the Z1 axis.

Additionally, to the turret face plate 161 are attached a plurality of tools T2 which are second tools used to machine a workpiece W2 grasped by the second main shaft 131 at the same positions as the attachment positions of the tools T1 as the first tools. The workpiece W2 is positioned to the tool T2 by movement control of the second head stock 130 in the direction of the X3 axis in which movement of the first tool rest 160 in the direction of the X3 axis used to machine the workpiece W2 is superposed on movement of the same in the direction of the X1 axis, and movement control of the second head stock 130 in the direction of the Z3 axis in which movement of the first tool rest 160 in the direction of the Z1 axis used to machine the workpiece W2 is superposed on movement of the same in the direction of the Z1 axis. Machining of the workpiece W2 using the tool T2 is carried out by movement control of the second head sock 130 in the directions of the X3 axis and the Z3 axis in which movement to machine the workpiece W2 is superposed on movement of the first tool rest 160 in the directions of the X1 axis and the Z1 axis with respect to the tool T2 which moves together with the tool T1.

It is to be noted that "movement" is used as a term representing a concept including a position, a speed and an acceleration in the following explanation of superposition control for the convenience's sake. Further, controlling relative movement such as a relative position or a relative acceleration between respective shafts required for controlling each shaft will be explained as "superposition control".

A second tool rest 180 is provide so as to be opposed to the first tool rest 160. A guide rail 182 is provided on the bed 110 in the direction of a Z2 axis parallel to the Z axis, and a saddle 183 capable of freely moving the direction of Z2 along the guide rail 182 is mounted on the guide rail 182. A guide rail 184 is provided to the saddle 183 in the direction of an X2 axis parallel to the X axis, and the second tool rest 180 is mounted on the guide rail 184. The second tool rest 180 can freely move in the direction of the X2 axis and the direction of the Z2 axis by drive of the non-illustrated drive mechanism. A turret face plate 181 is provided to the second tool rest 180 so as to be capable of sectional rotation. A plurality of tools are attached to the turret face plate 181. These tools include a tool T3 as a third tool used to machine the workpiece W1 and a tool T4 as a fourth tool used to machine the workpiece W2.

When the tool T3 is indexed to a workpiece machining position in order to machine the workpiece W1 (case shown in FIG. 1), the tool T3 is positioned with respect to the workpiece W1 by movement of the second tool rest 180 in the direction of the X2 axis and the direction of the Z2 axis.

When the tool T4 is indexed to a workpiece machining position in order to machine the workpiece W2, the tool T4 is positioned with respect to the workpiece W2 by movement of the second tool rest 180 in the direction of the X2 axis and the direction of the Z2 axis and movement of the second head stock 130 in the direction of the X3 axis and the direction of the Z3 axis or a combination of such movement.

FIG. 2 shows an enlarged view of a primary part of the first tool rest 160.

The tool T1 and the tool T2 are attached to the turret face plate 161 through a tool holder 165. The tool holder 165 is constituted by a holder main body 165*a* fixed to the turret face plate 161 by a bolt and the like, a holder 165*b* attached on the surface of the holder main body 165*a* on the first head stock 120 side, and a holder 165*c* attached to the surface of the holder main body 165*a* on the second head stock 130 side. The tool T1 is attached to the holder 165*b*, and the tool T2 is attached to the holder 165*c*.

Dimensions of respective parts of the holder 165*b* and the holder 165*c* are determined in such a manner that one workpiece (for example, the workpiece W1) does not interfere with the other workpiece (for example, the workpiece W2), another tool (for example, the tool T2), a holder (for example, the holder 165*c*) or the holder main body 165*a* when simultaneously machining the workpiece W1 by using the tool T1 and the workpiece W2 by using the tool T2.

In the tool holder 165 shown in FIG. 2, a distance L3 between a cutting edge of the tool T1 and the surface of the holder main body 165*a* in the direction of the Z1 axis is set to be larger than a machining length l of the workpiece W1.

As shown in FIG. 2, the workpiece W2 on the second head stock 130 side can be machined by any one of the tool T2 on the first tool rest 160 and the tool T4 (indicated by a virtual line in FIG. 2) on the second tool rest 180.

When trying to machine the workpiece W1 by using the tool T1 and machine the workpiece W2 by using the tool T2, the second head stock 130 may possibly come into contact with the first tool rest 160 depending on a quantity of movement of the first tool rest 160 in the direction of the X1 axis and a quantity of movement of the second head stock 130 in the direction of the X3 axis. In such a case, it is good enough to machine the workpiece W2 by using the tool T4 on the second tool rest 180 instead of the tool T2. By doing so, a concave deep recess portion (portion 163 indicated by a chain double-dashed line in FIG. 2) used to avoid interference with the second head stock 130 does not have to be formed on the first tool rest 160 side, or an initial position of the second head stock 130 where machining starts does not have to be set taking interference of the first tool rest 160 into consideration.

Description of Control Device

Figure 3:
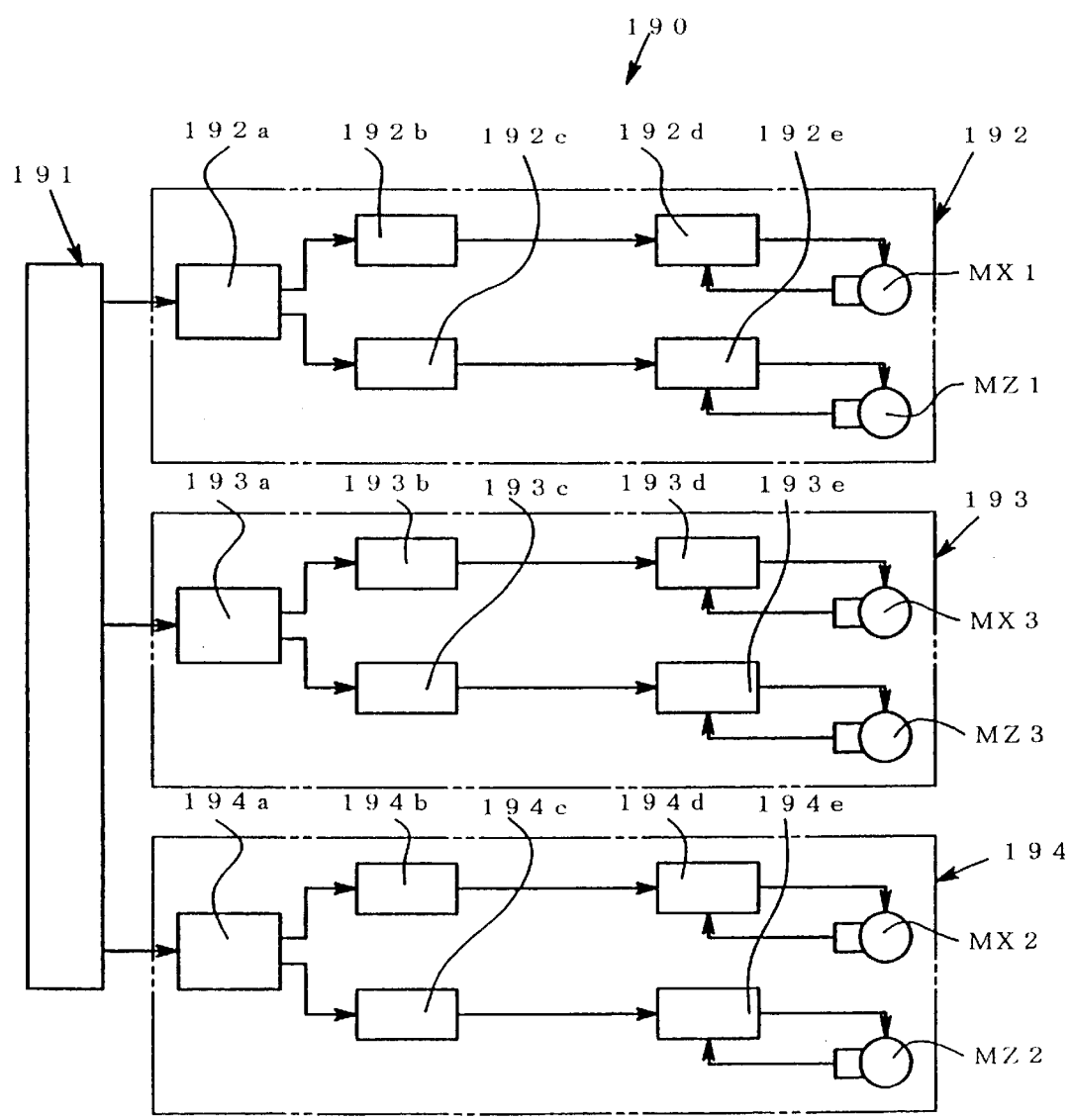
FIG. 3 is a control block diagram of a control device in the NC lathe according to the present invention.

A structure of a control device in the numerically controlled lathe having the above structure will now be described. FIG. 3 is a control block diagram showing a control device in the NC lathe 100.

The control device 190 has a central processing unit (CPU) 191, a first control system 192 which controls movement of the first tool rest 160 in the direction of the Z1 axis and the direction of the X1 axis in response to a command from the CUP 191, a second control system 193 which controls movement of the second head stock 130 in the direction of the Z3 axis and the direction of the X3 axis in response to a command from the CPU 191, and a third control system 194 used to move the second tool rest 180 in the direction of the X2 axis and the direction of the Z2 axis in accordance with a command from the CPU 191.

The first control system 192 has a first arithmetic operation circuit 192a used to move the first tool rest 160, speed processing circuits 192b and 192c which output speed signals in the direction of the X1 axis and the direction of the Z1 axis based on an output signal from the first arithmetic operation circuit 192a, and servo processing circuits 192d and 192e which move servo motors MX1 and MZ1 so as to move the first tool rest 160 at a predetermined speed in the direction of the X1 axis and the direction of the Z1 axis based on output signals from the speed processing circuits 192b and 192c.

The second control system 193 and the third control system 194 have the same structure as the first control system 192, and have arithmetic operation circuits 193a and 194a, speed processing circuits 193b, 194b, 193c and 194c, and servo processing circuits 193d, 194d, 193e and 194e which move the servo motors MX2, MX3, MZ2 and MZ3.

Description will now be given as to the effect of the control device 190 when causing the control device 190 to machine the workpiece.

For example, when machining the workpieces W1 and W2 by using the tools T1 and T2 attached to the first tool rest 160 and the tool T3 attached to the second tool rest 180, machining of the workpiece W1 is performed by using the tools T1 and T3 in accordance with movement control of the tool T1 by control of the first tool rest 160 in the direction of the Z1 axis and the direction of the X1 axis in the first control system 192 and movement control of the tool T3 by control of the Z2 axis and the X2 axis of the second tool rest 180 in the third control system 194. At the same time, in order to enable machining the workpiece W2 grasped by the second head stock 130 by using the tool T2 which moves together with the tool T1, a movement command of both or any one of the direction of the Z3 axis and the direction of the X3 axis required for machining the workpiece W2 is added to a movement command of the first tool rest 160 in the direction of the Z1 axis and the direction of the X1 axis, and movement control of the second head stock 130 in the direction of the Z3 axis and the direction of the X3 axis is carried out. As a result, movement of the second head stock 130 is controlled to be superposed on movement of the first tool rest 160, and the workpieces W1 and W2 can be machined by using the tools T1, T2 and T3 in cooperation with the first control system 192 and the second control system 193.

Moreover, when machining the workpieces W1 and W2 by using the tool T1 attached to the first tool rest 160 and the tools T3 and T4 attached to the second tool rest 180, there are carried out movement control of the tool T1 by control of the Z1 axis and the X1 axis of the first tool rest 160 in the first control system 192, and movement control of the tool T3 by control of the Z2 axis and the X2 axis of the second tool rest 180 in the third control system 194. At the same time, in order to enable machining the workpiece W2 grasped by the second head stock 130 by using the tool T4 which moves together with the tool T3, the CPU 191 adds a movement command of both or any one of the direction of the Z3 axis and the direction of the X3 axis required for machining the workpiece W2 to a movement command of the second tool rest 180 in the direction of the Z2 axis and the direction of the X2 axis, and carries out movement control of the second head stock 130 in the direction of the Z3 axis and the direction of the X3 axis. As a result, movement of the second head stock 130 is controlled to be superposed on movement of the second tool rest 180, and the workpieces W1 and W2 can be machined by using the tools T1, T3 and T4 in cooperation with the second control system 193 and the third control system 194.

Further, when machining the workpieces W1 and W2 by using the tools T1 and T2 attached to the first tool rest 160 and the tool T4 attached to the second tool rest 180, the CPU 191 controls machining of the workpiece W1 using the tool T1 by movement control over the tool T1 based on control in the direction of Z1 axis and the direction of the X1 axis of the first tool rest 160 in the first control system 192. At the same time, in order to enable machining of the workpiece W2 grasped by the second head stock 130 by the tool T2 which moves together with the tool T1, the CPU 191 adds a movement command of one or both of the direction of the Z3 axis and the direction of the X3 axis required for machining the workpiece W2 to a movement command in the direction of the Z1 axis and the direction of the X1 axis of the first too rest 160, and performs movement control in the direction of the Z3 axis and the X3 axis of the second head stock 130. As a result, movement of the second head stock 130 is controlled to be superposed on movement of the first tool rest 160.

Furthermore, in order to enable machining of the workpiece W2 grasped by the second head stock 130 by using the tool T4, the CPU 191 adds a movement command of both or one of the direction of the Z2 axis and the direction of the X2 axis of the second tool rest 180 required for machining the workpiece W2 to a movement command in the direction of the Z3 axis and the direction of the X3 axis of the second head stock 130, and carries out movement control in the direction of the Z2 axis and the direction of the X2 axis of the second tool rest 180. As a result, movement of the second tool rest 180 is controlled to be superposed on movement of the second head stock 130.

As described above, the workpieces W1 and W2 can be machined by using the tools T1 and T2 and the tool T4 based on cooperation of the first control system 192 and the second control system 193 and cooperation of the second control system 193 and the third control system 194.

Moreover, when machining the workpieces W1 and W2 by using the tool T2 attached to the first tool rest 160 and the tools T3 and T4 attached to the second tool rest 180, the CPU 191 controls machining of the workpiece W1 by movement control over the tool T3 based on control of the Z2 axis and the X2 axis of the second tool rest 180 in the third control system 194. At the same time, in order to enable machining of the workpiece W2 grasped by the second head stock 130 by using the tool T4 which moves together with the tool T3, the CPU 191 adds a movement command of both or one of the direction of the Z3 axis and the direction of the X3 axis required for machining the workpiece W2 to a movement command in the direction of the Z2 axis and the direction of the X2 axis of the second tool rest 180, and performs movement control in the direction of the Z3 axis and the direction of the X3 axis of the second head stock 130. As a result, movement of the second head stock 130 is controlled to be superposed on movement of the second tool rest 180.

In addition, in order to enable machining of the workpiece W2 grasped by the second head stock 130 by using the tool T2, the CPU 191 adds a movement command of both or one of the direction of the Z1 axis and the direction of the X1 axis of the first tool rest 160 required for machining the workpiece W2 to a movement command of the direction of the Z3 axis and the direction of the X3 axis of the second head stock 130, and executes movement command in the direction of the Z1 axis and the direction of the X1 axis of the first tool rest 160. As a result, movement of the first tool rest 160 is controlled to be superposed on movement of the second head stock 130.

As described above, the workpieces W1 and W2 can be machined by using the tools T2 and T3 and the tool T4 based on cooperation of the second control system 193 and the third control system 194 and cooperation of the first control system 192 and the second control system 193.

As described above, at least three of the tools T1 to T4 can be attached to the first tool rest 160 and the second tool rest 180, and the workpieces W1 and W2 can be simultaneously subjected to different kinds of machining.

Another Embodiment of Control Device

In the control device 190 described above, the CPU 191 adds movement of the second head stock 130 and the second tool rest 180 to movement of each of the first tool rest 160 and the second head stock 130 and outputs a movement command of the first tool rest 160, the second head stock 130 and the second tool rest 180.

In a control device 190' according to another embodiment which will now be described, a CPU 191' outputs a movement command required for the respective tools T1 to T4 to machine the workpieces W1 and W2, and a movement command fetched from another control system is added to this movement command in the middle of the respective control systems 192' to 194'.

Figure 4:
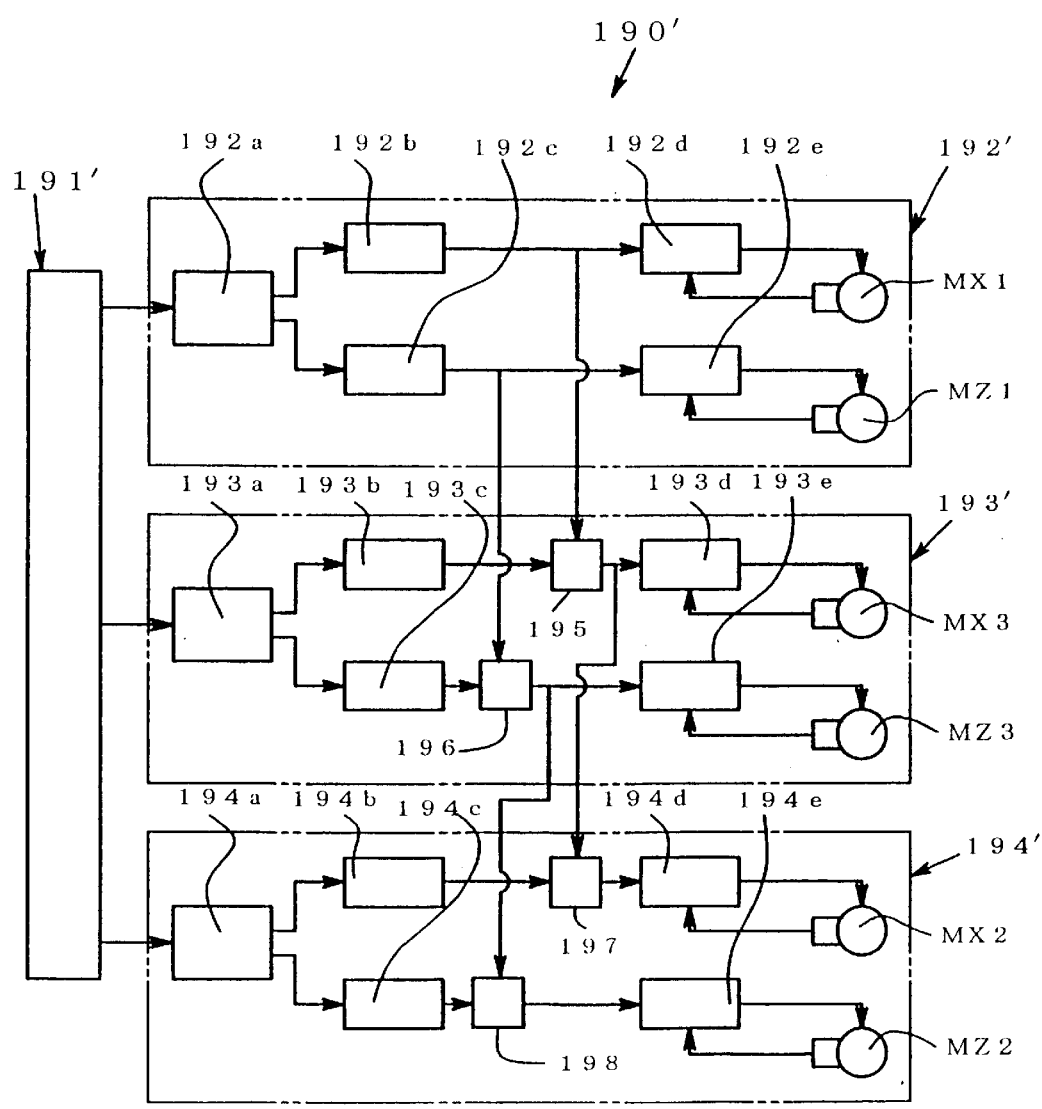
FIG. 4 concerns another embodiment of the control device in the NC lathe according to the present invention and is a control block diagram thereof.

FIG. 4 shows a block diagram of a control device according to another embodiment.

It is to be noted that like reference numerals denote the same parts and members as those in the control device depicted in FIG. 3, thereby omitting the detailed explanation.

The control device 190' has a central processing unit (CPU) 191', a first control system 192' which controls movement of the first tool rest 160 in the direction of the Z1 axis and the direction of the X1 axis in response to a command from the CPU 191', a second control system 193' which controls movement of the second head stock 130 in the direction of the Z3 axis and the direction of the X3 axis in response to a command from the CPU 191', and a third control system 194' which controls movement of the second tool rest 180 in the direction of the Z2 axis and the direction of the X2 axis in response to a command from the CPU 191'.

A superposition circuit 195 is provided between a speed processing circuit 193b and a servo processing circuit 193d and a superposition circuit 196 is provided between a speed processing circuit 193c and a servo processing circuit 193 in the second control system 193'.

The superposition circuit 195 adds a movement command of the second head stock 130 in the direction of the X3 axis used to machine the workpiece W2 by using the tool T2 (relative movement command of the workpiece W2 and the tool T2) to a movement command of the first tool rest 160 in the direction of the X1 axis, and outputs a result as a movement command of the second head stock 130 in the direction of the X3 axis to the servo processing circuit 193d.

The superposition circuit 196 adds a movement command of the second head stock 130 in the direction of the Z1 axis used to machine the workpiece W2 by using the tool T2 (relative movement command of the workpiece W2 and the tool T2) to a movement command of the first tool rest 160 in the direction of the Z3 axis, and outputs a result as a movement command of the second head stock 130 in the direction of the Z3 axis to the servo processing circuit 193e.

A superposition circuit 197 is provided between a speed processing circuit 194b and a servo processing circuit 194d and a superposition circuit 198 is provided between a speed processing circuit 194c and a servo processing circuit 194e in the third control system 194'.

The superposition circuit 197 adds a movement command of the second tool rest 180 in the direction of the X2 axis used to machine the workpiece W2 by using the tool T4 (relative movement command of the workpiece W2 and the tool T4) to a movement command of the second head stock 130 in the direction of the X3 axis, and outputs a result as a movement command of the second tool rest 180 in the direction of the X2 axis to the servo processing circuit 194d.

The superposition circuit 198 adds a movement command of the second tool rest 180 in the direction of the Z2 axis used to machine the workpiece W2 by using the tool T4 (relative movement command of the workpiece W2 and the tool T4) to a movement command of the second head stock 130 in the direction of the Z3 axis, and outputs a result as a movement command of the second tool rest 180 in the direction of the Z2 axis to the servo processing circuit 194e.

Incidentally, although not shown in particular, it is preferable to also provide superposition circuits to the first control system 192' and not only perform superposition between the second control system 193' and the third control system 194' but also execute superposition between the second control system 193' and the first control system 192'.

According to the control device 190', a movement command of the tool T1 in the direction of the X1 axis and the direction of the Z1 axis used to machine the workpiece W1 is outputted from the CPU 191' to the first control system 192', and a movement command of the tool T2 in the direction of the X1 axis and the direction of the Z1 axis used to machine the workpiece W2 (relative movement command of the workpiece W2 and the tool T2) is outputted from the CPU 191' to the second control system 193'. In addition, a movement command in the direction of the X3 axis and the direction of the Z3 axis used to machine the workpiece W2 (relative movement command of the workpiece W2 and the tool T2) is outputted from the CPU 191' to the third control system 194'.

The first control system 192' moves the tool T1 together with the first tool rest 160 based on an output from the CPU 191'. The second control system 193' adds a movement command of the first tool rest 160 to a movement command from the CPU 191', superposes movement, and moves the second head stock 130. The third control system 194' adds a movement command of the second head stock 130 to a movement command from the CPU 191', superposes movement, and moves the second tool rest 180.

Procedure of Superposition

In the NC lathe according to the present invention, superposition is carried out in accordance with a predetermined procedure. The procedure of superposition in the machining conformations of FIGS. 1 and 2 will now be described hereinafter with reference to FIGS. 5 to 7.

Figure 5:
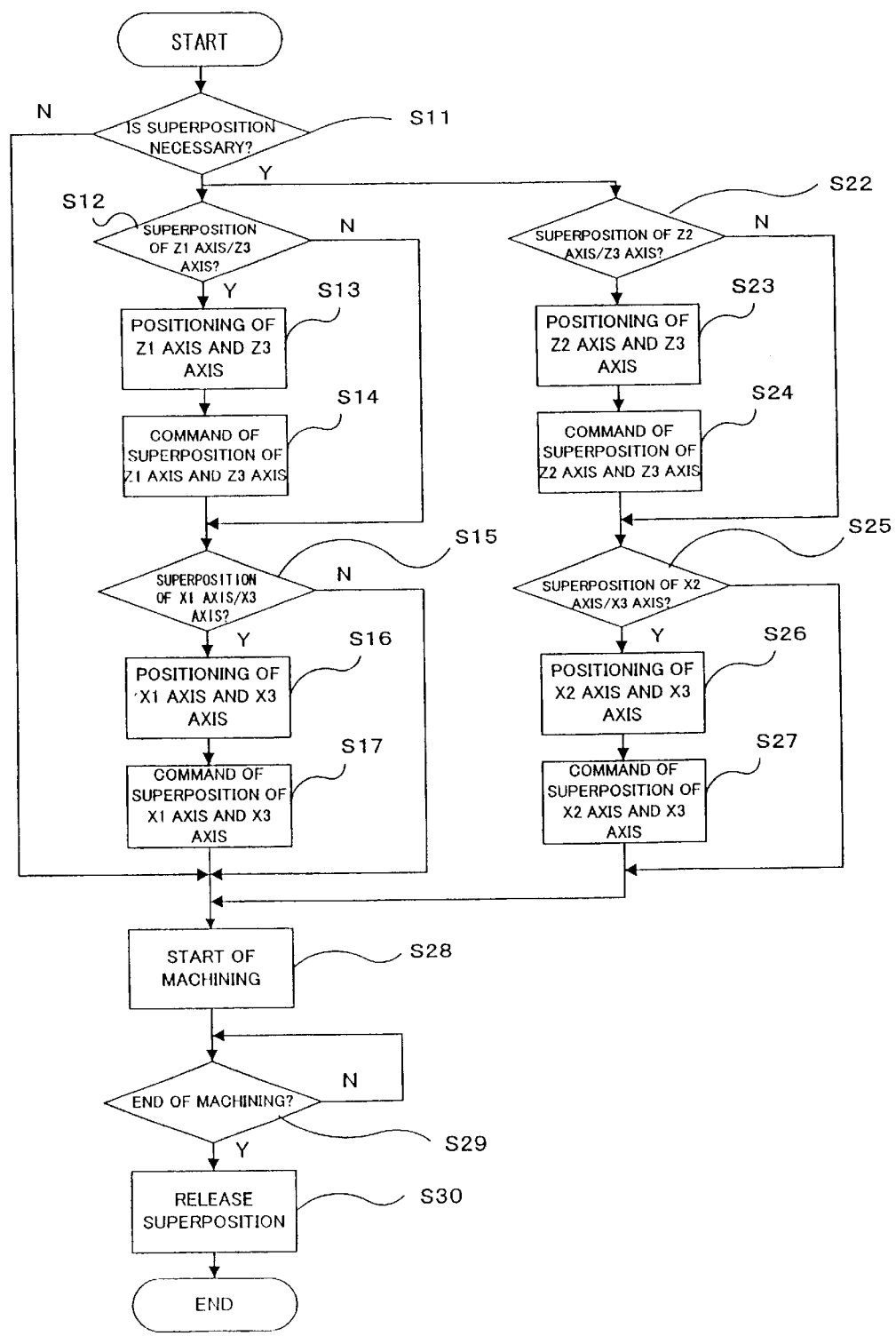
FIG. 5 is a flowchart for illustrating a procedure of control in the NC lathe and a cutting method according to the present invention.

FIG. 5 is a flowchart for illustrating a procedure of control in the NC lathe and the cutting method according to the present invention.

The CPUs 191 and 191' judge whether superposition is necessary from an NC machining program used to machine the workpieces W1 and W2 (step S11). When superposition is not necessary, machining of the workpiece W1 and the workpiece W2 using the tools T1 to T4 is sequentially carried out in accordance with the NC machining program (step S28).

When superposition is necessary, a judgment is made upon which one of the Z axis and the X axis is an axis to be superposed, which pair of the Z1 axis and the Z3 axis or the Z2 axis and the Z3 axis is the axes to be superposed in case of the Z axis, and which pair of the X1 axis and the X3 axis or the X2 axis and the X3 axis is the axes to be superposed in case of the X axis (steps S12, S22, S15 and S25).

When the axes to be superposed are the Z1 axis and the Z3 axis, after positioning the Z1 axis and the Z3 axis (step S13), superposition of the Z1 axis and the Z3 axis is carried out (step S14). When the axes to be superposed are the Z2 axis and the Z3 axis, after positioning the Z2 axis and the Z3 axis (step S23), superposition of the Z2 axis and the Z3 axis is performed (step S24).

When the axes to be superposed are the X1 axis and the X3 axis, after positioning the X1 axis an the X3 axis (step S16), superposition of the X1 axis and the X3 axis is performed (step S17). When the axes to be superposed are the X2 axis and the X3 axis, after positioning the X2 axis and the X3 axis (step S26), superposition of the X2 axis and the X3 axis is carried out (step S27).

As described above, the axis to be superposed is positioned when superposing one axis because a programmer who creates a machining program can readily grasp the positional relationship between the tool and the workpiece.

In the machining examples of FIGS. 1 and 2, in order to attach the tools T1 and T2 to the first tool rest 160, machine the workpieces W1 and W2 and machine the workpiece W1 by using the tool T3 attached to the second tool rest 180, the X1 axis and the X3 axis are superposed, and the Z1 axis and the Z3 axis are superposed. Upon completion of superposition, machining of the workpiece W1 by using the tool T1, machining of the workpiece W2 by using the tool T2 and machining of the workpiece W1 by using the tool T3 are simultaneously carried out (step S28).

When machining is terminated (step S29), superposition is released (step S30), and the processing enters a standby mode until the next machining.

It is to be noted that description has been given as to the case where presence/absence of superposition is confirmed at the steps S11, S12, S15, S22 and S25 but this confirmation can be omitted.

Figure 6:
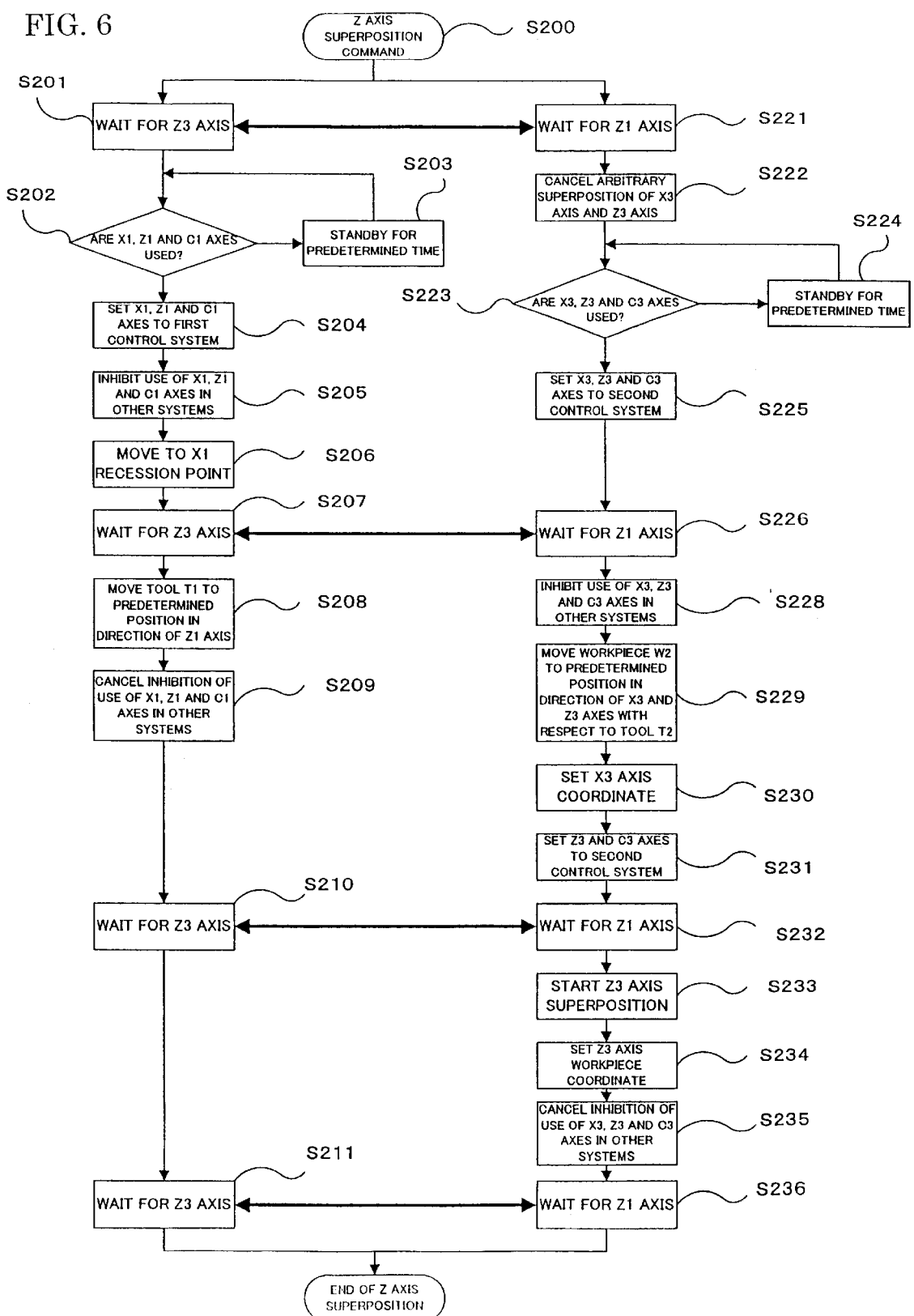
FIG. 6 is a flowchart for illustrating a concrete procedure of superposition of a pair of a Z1 axis and a Z3 axis.

A concrete procedure of superposition of the Z1 axis and the Z3 axis and superposition of the X1 axis and the X3 axis in the processing examples shown in FIGS. 1 and 2 will now be described with reference to flowcharts of FIGS. 6 and 7.

It is to be noted that superposition of the X1 axis an the X3 axis is carried out after completion of superposition of the Z1 axis and the Z3 axis in the following description for the convenience's sake.

Superposition of Z Axis: Superposition of Z1 Axis and Z3 Axis

When there is a Z axis superposition command in the NC machining program (step S200), the processing waits for a program execution start timing for the Z1 axis and the Z3 axis (steps S201 and S221).

In the first control system concerning the first tool rest (left system in the flowchart of FIG. 6), a judgment is made upon whether the X1 axis, the Z1 axis and a C1 axis (rotational axis around the Z1 axis) are used (step S202). When any one or all of the X1 axis, the Z1 axis an the C1 axis are being used, the preparation operation is interrupted for a predetermined time, the processing enters the standby mode (step S203) and waits until the X1 axis, the Z1 axis and the C1 axis are not used.

When all of the X1 axis, the Z1 axis and the C1 axis are not used, new axes X1, Z1 and C1 for machining are set in the first control system (step S204).

Thereafter, using the X1 axis, the Z1 axis and the C1 axis in any other control system is inhibited (step S205), the first tool rest 160 is moved to a recession position specified on the X1 axis (step S206) and the processing waits for the second control system concerning the second head stock 130 (step S207).

In the second control system (right system in the flowchart of FIG. 6), after performing matching of the NC machining program execution start timing (step S221), superposition specified on the X3 axis and the Z3 axis is released (step S222). Then, a judgment is made upon whether the X3 axis, the Z3 axis and a C3 axis (rotational axis around the Z3 axis) are used (step S223). When any one or all of the X3 axis, the Z3 axis and the C3 axis are being used, and the processing is interrupted for a predetermined time and enters the standby mode (step S224). The processing waits until the X3 axis, the Z3 axis and the C3 axis are not used.

When all of the X3 axis, the Z3 axis and the C3 axis are not used, new axes X3, Z3 and C3 are set to the second control system (step S225).

Upon completion of the above-described processing, the processing waits for the first control system (step S226).

Upon completion of waiting (steps S207 and S226), the first control system moves the first tool rest 160 in the direction of the X1 axis and the direction of the Z1 axis until a distance between the tool T1 and the workpiece W1 becomes a predetermined distance (positional relationship) (step S208).

Thereafter, inhibition of use of the X1 axis, the Z1 axis and the C1 axis in any other control system is canceled (step S209), and the processing waits for the second control system (step S210).

In the second control system, upon completion of waiting (steps S207 and S226), use of the axes X3, Z3 and C3 in any other control system is inhibited (step S228). Then, the second head stock 130 is moved in the direction of the Z3 axis and the direction of the X3 axis so that a distance between the tool T2 and the workpiece W2 becomes a predetermined distance (positional relationship) (step S229). Subsequently, a coordinate system of the workpiece W2 on the X3 axis at this position is set (step S230), and new axes Z3 and C3 are set in the second control system (step S231). As a result, a command to the X3 axis is disabled, and a position of the workpiece W2 in the direction of the X3 axis is fixed.

Thereafter, the processing waits for the first control system (step S232).

Upon completion of waiting (steps S210 and 232), superposition of the Z3 axis is started (step S233), and a coordinate system of the workpiece W2 on the Z3 axis is set (step S234). Inhibition of use of the X3 axis, the Z3 axis and the C3 axis in any other control system is canceled (step S235), and the processing waits for the first control system (S236).

Upon completion of waiting (steps S211 and S236), superposition of the Z1 axis and the Z3 axis is terminated.

Superposition of X Axis: Superposition of X1 Axis and X3 Axis

Figure 7:
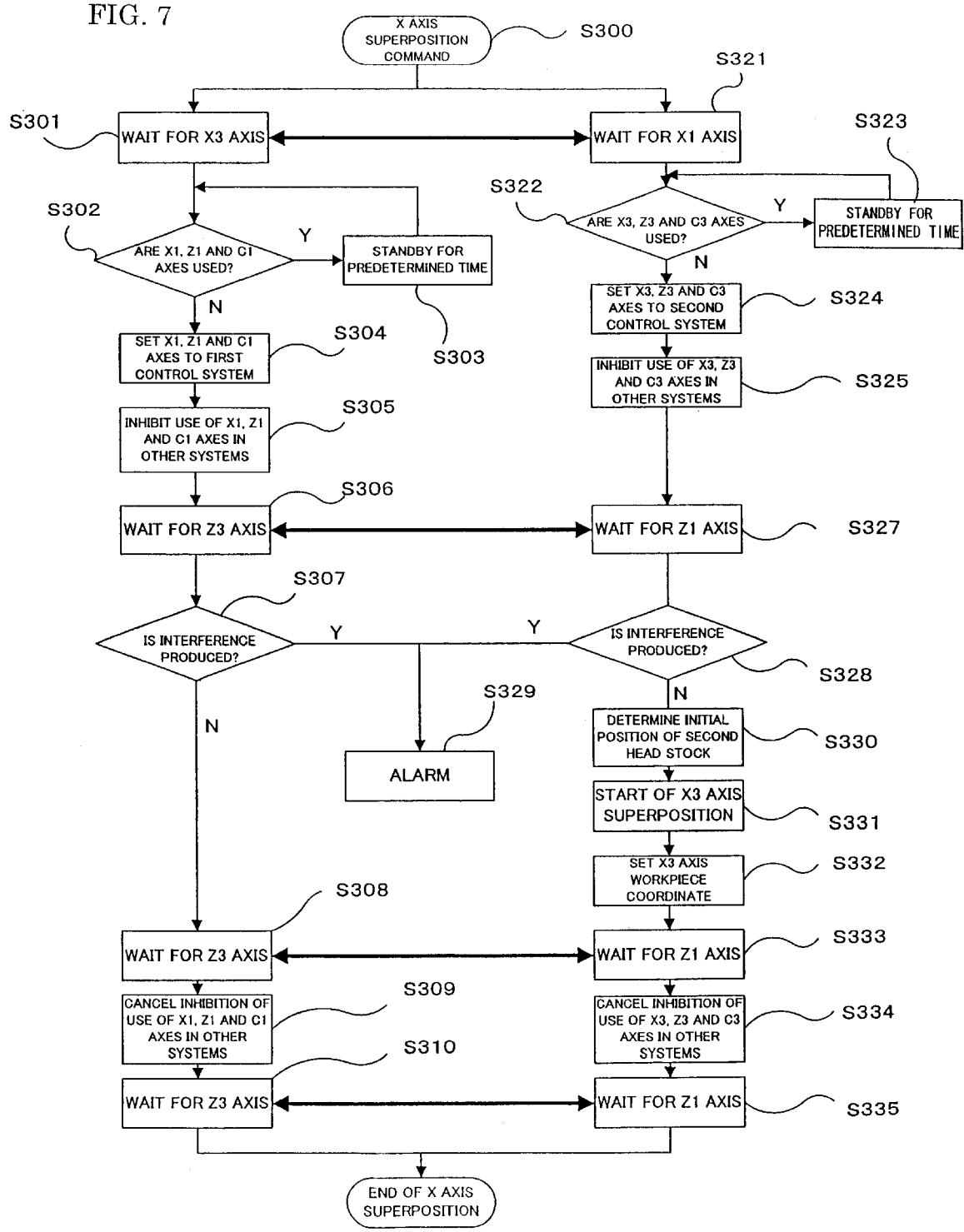
FIG. 7 is a flowchart for illustrating a concrete procedure of superposition of a pair of an X1 axis and an X3 axis.

As shown in FIG. 7, when there is a superposition command of the X axis (step S300), the program execution timings are matched in the first control system and the second control system (steps S301 and S321).

In the first control system, a judgment is made upon whether the X1 axis, the Z1 axis, and the C1 axis are used (step S302), the processing enters the standby mode for a predetermined time when they are used (step S303), and it waits until the X1 axis, the Z1 axis and the C1 axis are not used.

If they are not used, new axes X1, Z1 and C1 are set to the first control system (step S304). Then, use of the axes X1, Z1 and C1 in any other control system is inhibited (step S305), and the processing waits for the second control system (step S306).

In the second control system, after matching the program execution start timing (step S31), a judgment is made upon whether the X3 axis, the Z3 axis and the C3 axis are used (step S322). If they are used, the processing enters the standby mode for a predetermined time (step S323) and waits until the X3 axis, the Z3 axis and the C3 axis are not used.

If they are not used, new axes X3, Z3 and C3 are set to the second control system (step S324), and use of these axes in any other control system is inhibited (step S325).

Upon completion of such processing, the second control system waits for the first control system (step S327).

After termination of waiting (steps S306 and S327), a judgment is made upon whether the second head stock 130 does not interfere with the first tool rest 160 and others when machining the workpiece W2 by using the tool T2 in accordance with the NC program (steps S307 and S328).

If the interference may possibly occur, notification is performed by using an alarm (step S329), and the subsequent machining is stopped. An operator confirms a content of the alarm and may set in such a manner that machining of the workpiece W1 using the tool T1 and machining of the workpiece W2 using the tool T2 are performed separately or set in such a manner that the tool T4 is attached to the second tool rest 180 and machining of the workpiece W2 is carried out by using this tool T4.

If the interference is unlikely to occur, an initial position of the second head stock 130 is set in such a manner that a position of the workpiece W2 relative to the tool T2 has a predetermined positional relationship (step S330). Then, superposition of the X3 axis is started (step S331), and the work axis of the X3 axis is set (step S332).

Upon completion of the above-described processing, the procedure waits for the first control system (steps S308 and S333).

Upon completion of waiting, inhibition of use of the respective axes in any other control system is canceled (steps S309 and S334), and waiting is performed (steps S310 and S335), thereby terminating superposition of the X1 axis and the X3 axis.

As to superposition of the Z axis and superposition of the X axis, it is possible to set in such a manner that superposition of one axis is performed before that of the other axis, but superposition of the both axes may be carried out at the same time.

In addition, preferably, it is good enough to macro-program the procedure of superposition of the Z axis and the procedure of superposition of the X axis. By macro-programming these procedures, the machining program is simplified, and the superposition operation can be also facilitated.

According to the present invention, like a pair of the X1 axis and the X3 axis and a pair of the Z1 axis and the Z3 axis, superposition of movement of at least two or more axes which are not parallel to each other can be performed, and a plurality of different kinds of machining can be simultaneously applied to a plurality of workpieces grasped by a plurality of main shafts by using a plurality of tools attached to at least one tool rest. As a result, the machining time can be shortened, and the structure of the numerically controlled lathe can be simplified and made compact, thereby obtaining the small and inexpensive numerically controlled lathe.

Additionally, since more kinds of machining than the prior art can be simultaneously applied to the workpieces grasped by the two main shafts, the machining time can be shortened, and it is possible to greatly reduce a price of the numerically controlled lathe and the machining cost of the workpiece by using the numerically controlled lathe.

The effect of the numerically controlled lathe having the control device with the above-described structure will now be explained with reference to FIGS. 1 to 3.

In the machining example shown in FIG. 2, the tool T1 attached to the first tool rest 160 is a threading tool used to form a thread groove on the outer surface of the workpiece W1, and the tool T2 is a cutting tool used to perform step machining and form a chamfer on the outer peripheral surface of the workpiece W2 on the second edge surface side. Further, the tool T3 attached to the second tool rest 180 is a cutting tool used to form a V-shaped groove on the outer surface of the workpiece W1.

The first tool rest 160 is moved in the direction of the X1 axis and the direction of the Z1 axis and the tool T1 is positioned with respect to the workpiece W1. The second tool rest 180 is moved in the direction of the X2 axis and the direction of the Z2 axis, and the tool T3 is positioned with respect to the workpiece W1. The second head stock 130 is moved in the direction of the X3 axis and the direction of the Z3 axis, and the workpiece W2 is positioned with respect to the tool T2.

Then, cutting processing of the outer surface of the workpiece W1 is performed by using the tool T1 while rotating the workpieces W1 and W2 together with the first main shaft and the second main shaft and moving the first tool rest 160 in the direction of the X1 axis and the direction of the Z1 axis, and cutting processing of the outer surface of the workpiece W1 is effected by using the tool T3 while moving the second tool reset 180 in the direction of the X2 axis and the direction of the Z2 axis.

The CPU 191 feeds the first tool rest 160 in the direction of the X1 axis and the direction of the Z1 axis by movement required for machining the workpiece W1 by using the tool T1, and feeds the second tool rest 180 in the direction of the X2 axis and the direction of the Z2 axis by movement required for machining the workpiece W1 by using the tool T3.

Further, the CPU 191 superposes movement in the direction of the X3 axis and the direction of the Z3 axis required for machining the workpiece W2 by using the tool T2 on movement of the first tool rest 160 in the direction of the Z1 axis and the direction of the X1 axis, and feeds the second head stock 130 in the direction of the X3 axis and the direction of the Z3 axis.

In this manner, the two workpieces W1 and W2 can be simultaneously machined by using the three tools T1, T2 and T3.

According to the NC lathe of the present invention, the workpiece W1 on the first head stock 120 side and the workpiece W2 on the second head stock 130 side can be simultaneously machined by using three tools out of the four tools, i.e., the first tool T1 to the fourth tool T4.

Furthermore, a rotary tool such as a drill or an end mill can be attached to the first tool rest 160 or the second tool rest 180, and machining such as drilling or key way grinding can be applied on the outer peripheral surface or the end surface of the workpieces W1 and W2. When attaching a rotary tool such as a drill to the first tool rest 160 or the second tool rest 180, drilling or the like may be performed by rotating the first main shaft 121 or the second main shaft 131, but this machining may be carried out by providing a rotary drive mechanism including a motor used to rotate a tool to the first tool rest 160 or the second tool rest 180 and rotating the rotary tool such as a drill or an end mill attached to the first tool rest 160 or the second tool rest 180.

Other machining examples using the NC lathe according to the present invention will now be described.

Other Machining Examples: First Machining Example

Figure 8:
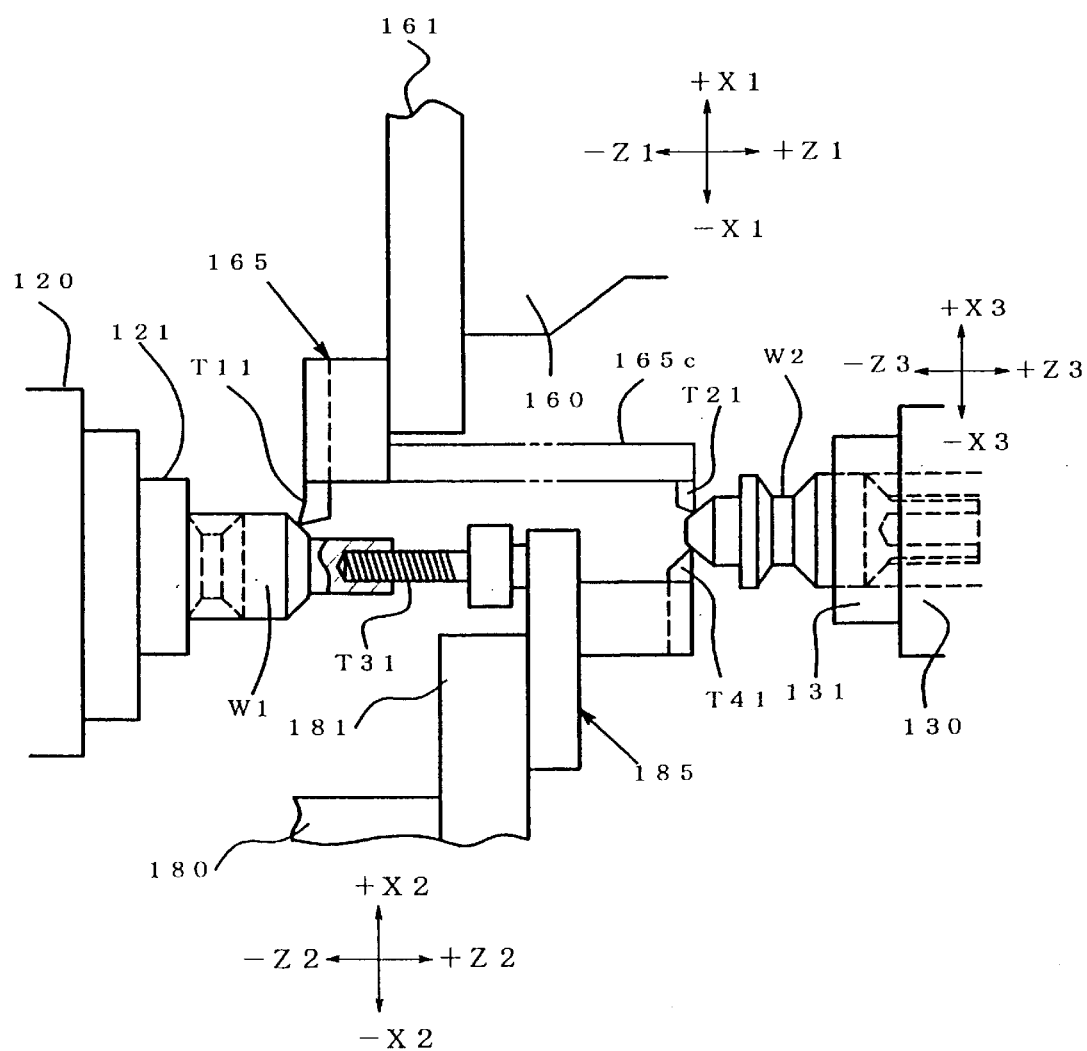
FIG. 8 concerns another embodiment of the cutting method according to the present invention and is a schematic view showing a first machining example thereof.

FIG. 8 shows a first machining example.

A cutting tool T11 used to machine the outer surface of the workpiece W1 is attached to the first tool rest 160, and a drill T31 used to drill the workpiece W1 and a cutting tool T41 used to machine the outer surface of the workpiece W2 are attached to the second tool rest 180 through a holder 185.

It is to be noted that the workpiece W2 can be machined by attaching a cutting tool T21 to the first tool rest 160 as indicated by a virtual line in FIG. 8.

However, like the machining example in FIG. 8, when trying to machine the end surface of the workpiece W1 by using the drill T31 as a third tool, since the drill T31 must be arranged between the workpiece W1 and the workpiece W2, a large gap must be assured between the workpiece W1 and the workpiece W2, and an arm length of the holder 165c which holds the cutting tool T21 must be elongated. When the length of the arm 165c is long, the machining accuracy is lowered.

In the present invention, since the second tool rest 180 has movement axes X2 and Z2 along which movement control is enabled in the same direction as the first tool rest 160, the similar cutting tool T41 can be attached to the second tool rest 180 in place of attaching the cutting tool T21 to the first tool rest 160, and desired machining can be applied to the workpiece W2.

The cutting tool T11 is positioned with respect to the workpiece W1 by moving the first tool rest 160 in the direction of the X1 axis and the direction of the Z1 axis. The second tool rest 180 is moved in the direction of the X2 axis and the direction of the Z2 axis, the drill T31 and the cutting tool T41 are moved between the first head stock 120 and the second head stock 130, the drill T31 is positioned with respect to the workpiece W1, the second head stock 130 is moved in the direction of the X3 axis and the direction of the Z3 axis, and the workpiece W2 is positioned with respect to the cutting tool T41.

Then, the cutting processing of the outer surface of the workpiece W1 is carried out by using the cutting tool T11 while rotating the workpieces W1 and W2 together with the first main shaft 121 and the second main shaft 131 and moving the first tool rest 160 in the direction of the X1 axis and the direction of the Z1 axis.

Moreover, drilling is applied on the end surface of the workpiece W1 while moving the second tool rest 180 in the direction of the Z2 axis. In addition, movement in the direction of the Z3 axis required for machining using the cutting tool T41 is superposed on movement of the second tool rest 180 in the direction of the Z2 axis, and the second head stock 130 is moved in the direction of the Z3 axis. Also, the second head stock 130 is moved in the direction of the X3 axis at a speed required for machining using the cutting tool T41.

As a result, the two workpieces W1 and W2 can be simultaneously carried out by using the three tools T11, T31 and T41.

It is to be noted that the axes to be superposed are a pair of the X2 axis and the X3 axis and a pair of the Z2 axis and the Z3 axis in this machining example. Therefore, the workpieces W1 and W2 can be simultaneously machined by utilizing the procedure of superposition described in connection with FIGS. 5 to 7.

Second Machining Example

Figure 9:
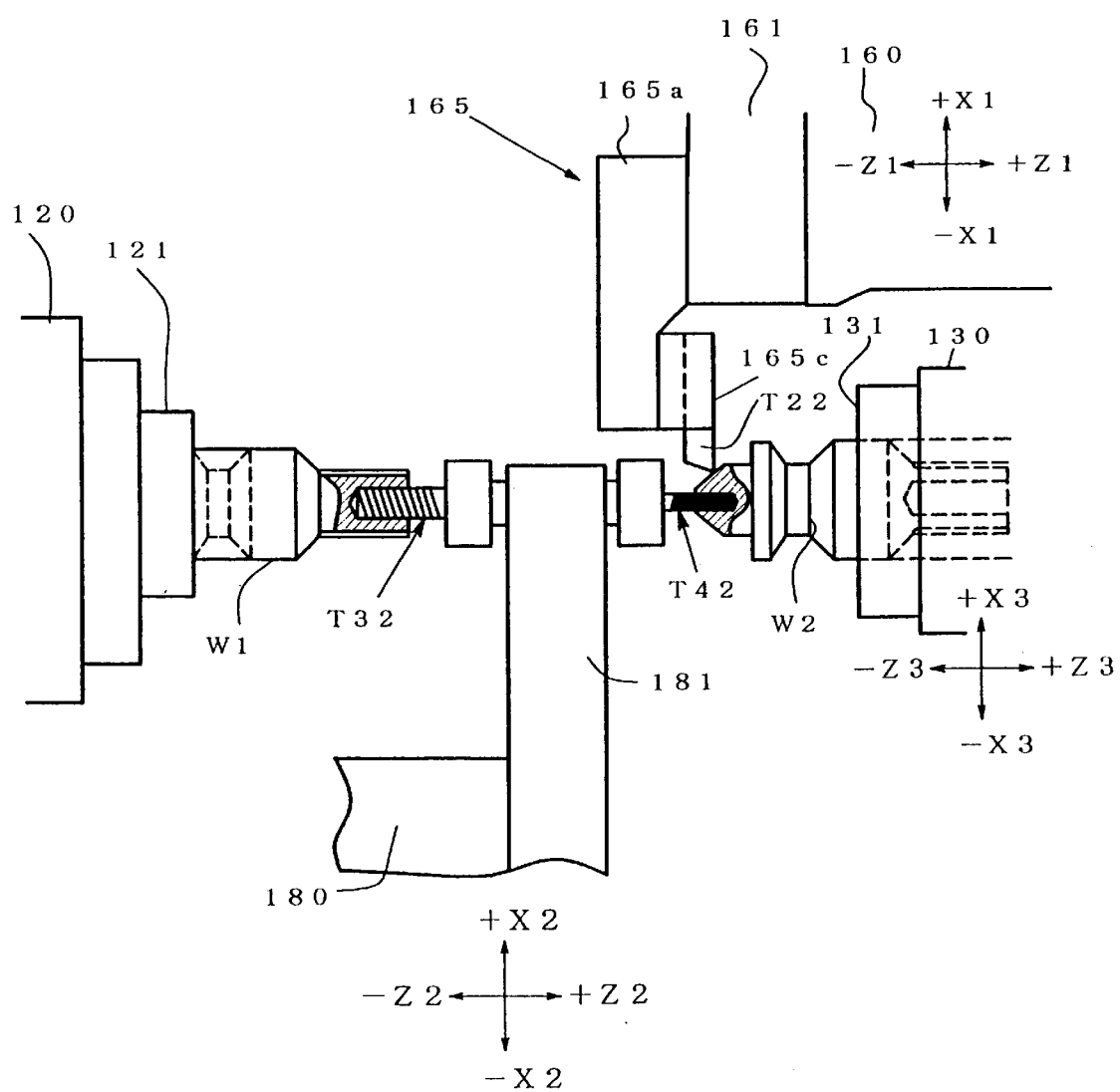
FIG. 9 concerns still another embodiment of the cutting method according to the present invention and is a schematic view showing a second machining example thereof.

FIG. 9 shows a second machining example.

A cutting tool T22 used to machine the outer surface of the workpiece W2 is attached to the first tool rest 160, and the drill T32 used to drill the workpiece W1 and the drill T42 used to drill the workpiece W2 are attached to the second tool rest 180.

The first tool rest 160 is moved in the direction of the X1 axis and the direction of the Z1 axis, and the cutting tool T22 is positioned with respect to the workpiece W2. At the same time, the second tool rest 180 is moved in the direction of the X2 axis and the direction of the Z2 axis, the drill T32 and the drill T42 are arranged between the workpiece W1 and the workpiece W2, the drill T32 is caused to face the end surface of the workpiece W1, and the drill T42 is caused to face the end surface of the workpiece W2.

In this state, the second tool rest 130 is moved in the direction of the Z2 axis, and the workpiece W1 is drilled by the drill T32. At the same time, the workpiece W2 is drilled by using the drill T42 while the second head stock 130 is superposed on movement of the second tool rest 180 in the direction of the Z2 axis and moved in the direction of the Z3 axis.

Additionally, the outer peripheral surface of the workpiece W2 is machined by the cutting tool T22 while the first tool rest 160 is superposed on movement of the second head stock 130 and moved in the direction of the X1 axis and the direction of the Z1 axis.

It is to be noted that the axes to be superposed are a pair of the Z2 axis and the Z3 axis and a pair of the Z3 axis and the Z1 axis in this machining example. Therefore, the workpieces W1 and W2 can be simultaneously machined by utilizing the procedure of superposition described in connection with FIGS. 5 to 7.

In the above machining example, it is preferable to use a right-handed tool as the tool T32 and a left-handed tool as the tool T42 and perform drilling by simultaneously rotating the tools by a non-illustrated rotary mechanism common to the tool T32 and the tool T42 included in the turret face plate 181. In this case, as to rotation of the workpiece W2 grasped by the second main shaft 131, a number of revolutions optimum for machining using the tool T22 is set.

The number of revolutions of the tool T42 is set in such a manner that a difference between the number of revolutions of the second main shaft 131 and the number of revolutions of the tool T42 becomes the number of the revolutions optimum for machining the workpiece W2 by using the tool T42. Likewise, the number of revolutions of the first main shaft 121 is set in such a manner that a difference between the number of revolutions of the first main shaft 121 and the number of revolutions of the tool T32 (equal to the number of revolutions of the tool T42) becomes the number of revolutions optimum for machining the workpiece W1 by using the tool T32.

It is to be noted that machining can be performed without rotating the tool T32 and the tool T42 when the high machining accuracy is not required in drilling of the workpiece W2 by using the tool T42. In this case, the number of revolutions of the tool T42 with respect to the workpiece W2 is determined based on the number of revolutions of the second main shaft 131 set to be optimum for machining the workpiece W2 by using the tool T22.

In this manner, according to the present invention, besides superposition control using relative movement between the respective axes in movement control in the direction of the X axis and the direction of the Z axis, control over the number of revolutions in each rotary shaft is possible.

Third Machining Example

Figure 10:
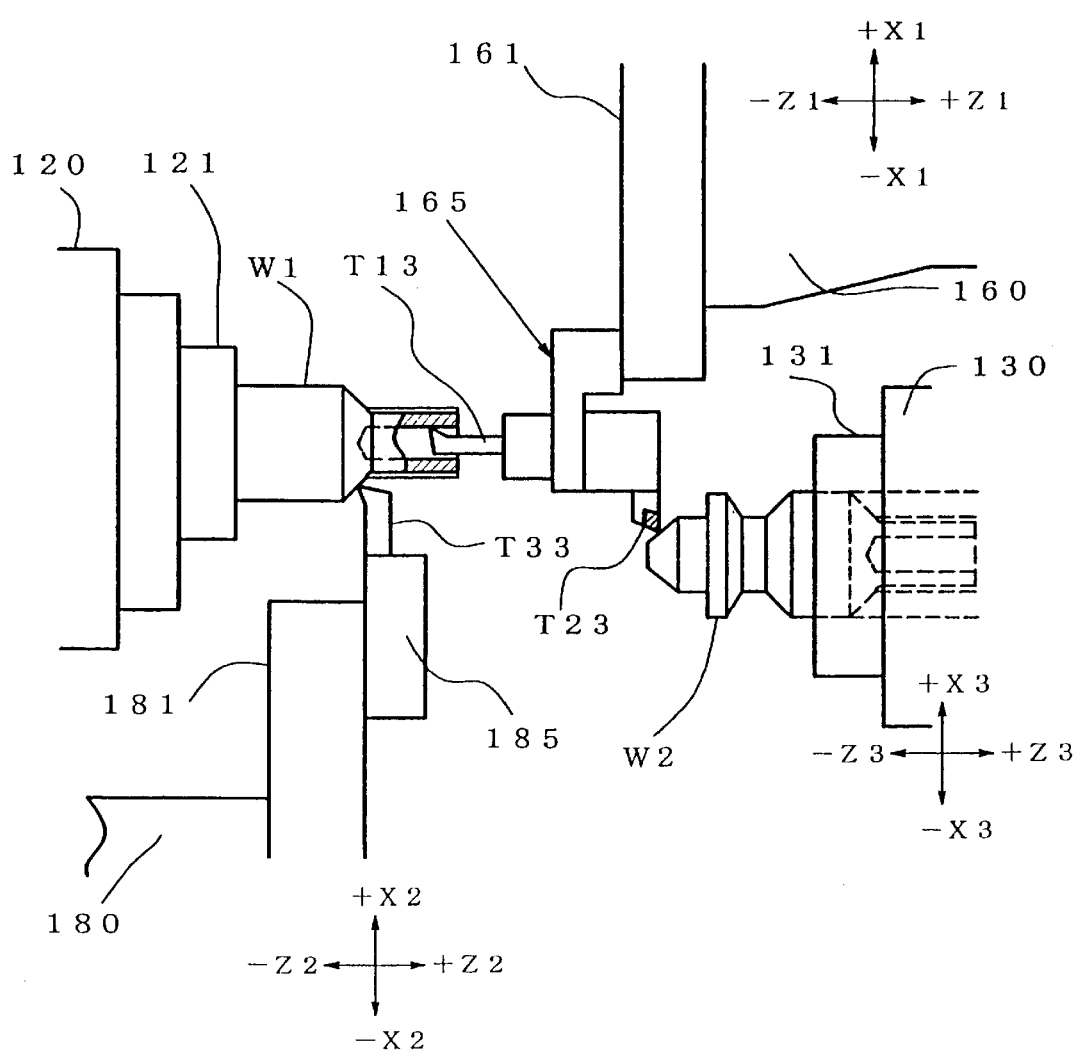
FIG. 10 concerns yet another embodiment of the cutting method according to the present invention and is a schematic view showing a third machining example thereof.

FIG. 10 shows a third machining example.

A boring tool T13 used to machine the inner surface of a hole of the workpiece W1 and a cutting tool T23 used to machine the outer surface of the workpiece W2 are attached to the first tool rest 160, and a cutting tool T33 used to machine the outer surface of the workpiece W1 is attached to the second tool rest 180.

The boring tool T13 is positioned with respect to the workpiece W1 by moving the first tool rest 160 in the direction of the X1 axis and the direction of the Z1 axis. At the same time, the second head stock 130 is moved in the direction of the X3 axis and the direction of the Z3 axis, and the workpiece W2 is positioned with respect to the cutting tool T23. Further, the second tool rest 180 is moved in the direction of the X2 axis and the direction of the Z2 axis, and the cutting tool T33 is positioned with respect to the workpiece W1.

In this state, the workpiece W1 is machined by using the boring tool T13 and the cutting tool 33 while the first tool rest 160 is moved in the direction of the X1 axis and the direction of the Z1 axis and the second tool rest 180 is moved in the direction of the X2 axis and the direction of the Z2 axis.

At the same time, the workpiece W2 is machined by using the cutting tool T23 while superposing the second head stock 130 on movement of the first tool rest 160 in the direction of the Z1 axis and moving it in the direction of the X3 axis and the direction of the Z3 axis.

It is to be noted that the axes to be superposed are a pair of the X1 axis and the X3 axis and a pair of the Z1 axis and the Z3 axis in this machining example. Therefore, the workpieces W1 and W2 can be simultaneously machined by utilizing the procedure of superposition described in connection with FIGS. 5 to 7.

Fourth Machining Example

Figure 11:
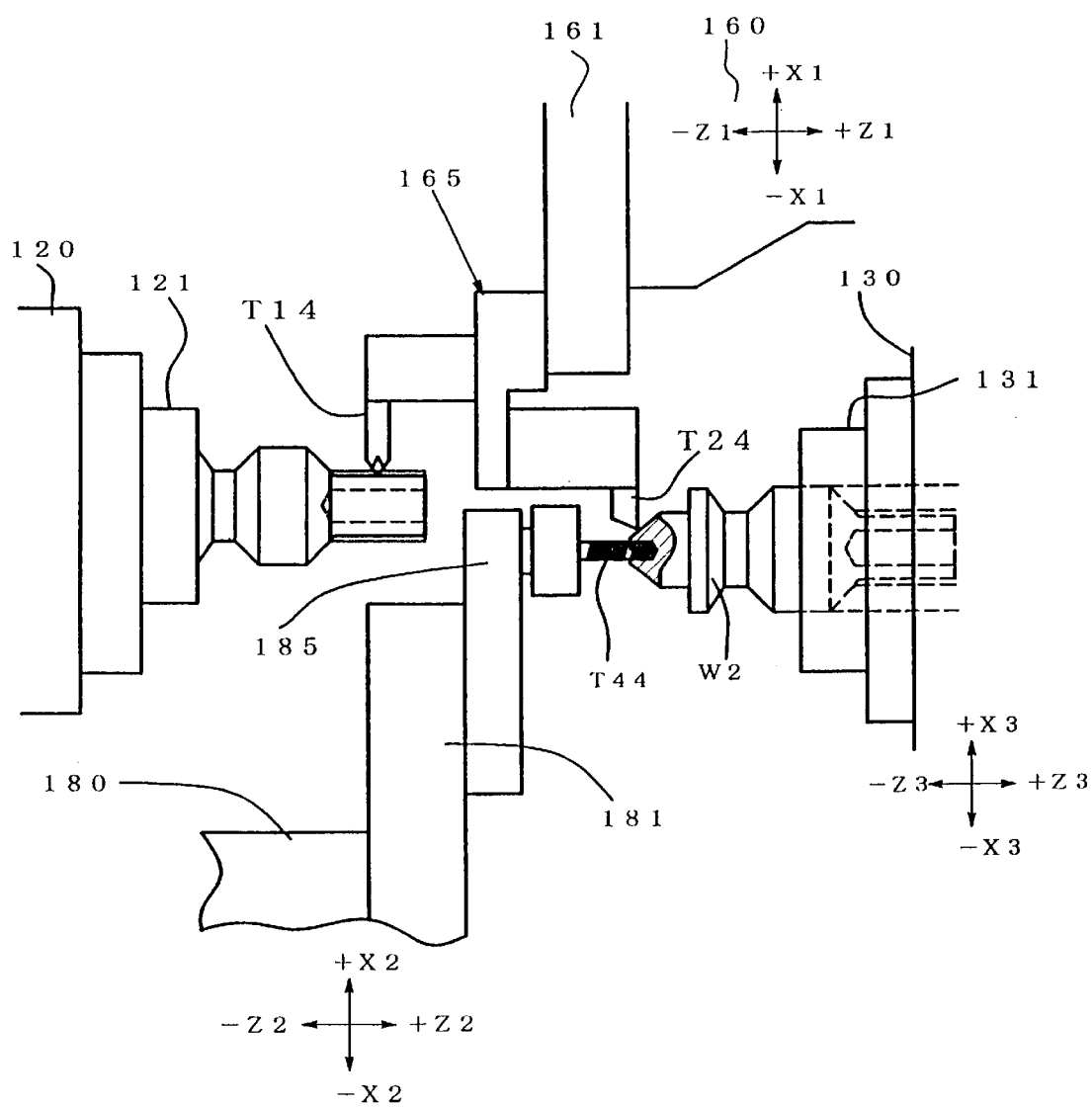
FIG. 11 concerns a further embodiment of the cutting method according to the present invention and is a schematic view showing a fourth machining example thereof.

FIG. 11 shows a fourth machining example.

A threading tool T14 to perform thread cutting on the outer peripheral surface of the workpiece W1 and a cutting tool T24 used to machine the outer surface of the workpiece W2 are attached to the first tool rest 160, and a drill T44 used to drill the end surface of the workpiece W2 is attached to the second tool rest 180.

The first tool rest 160 is moved in the direction of the X1 axis and the direction of the Z1 axis, and the threading tool T14 is positioned with respect to the workpiece W1. At the same time, the second head stock 130 is moved in the direction of the X3 axis and the direction of the Z3 axis, and the workpiece W2 is positioned with respect to the cutting tool T24. Furthermore, the second tool rest 180 is moved in the direction of the X2 axis and the direction of the Z2 axis, and the drill T44 is positioned with respect to the workpiece W2.

In this state, the workpiece W1 is machined by using the threading tool T14 while moving the first tool rest 160 in the direction of the X1 axis and the direction of the Z1 axis.

At the same time, the workpiece W2 is machined by using the cutting tool T24 while superposing the second head stock 130 on movement of the first tool rest 160 in the direction of the Z1 axis and the direction of the X1 axis and moving it in the direction of the X3 axis and the direction of the Z3 axis. Moreover, the workpiece W2 is machined by using the drill T44 while superposing the second tool rest 180 on movement of the second head stock 130 in the direction of the Z3 axis and the direction of the X3 axis and moving it in the direction of the X2 axis and the direction of the Z2 axis.

In this machining example, the axes to be superposed are a pair of the X1 axis and the X3 axis, a pair of the Z1 axis and the Z3 axis, a pair of the X3 axis and the X2 axis, and a pair of the Z3 axis and the Z2 axis. In this case, superposition of a pair of the X1 axis and the X3 axis and a pair of the Z1 axis and the Z3 axis is carried out in accordance with the procedure shown in FIGS. 6 and 7, and superposition control of a pair of the X3 axis and the X2 axis and a pair of the Z3 axis and the Z2 axis is effected based on the similar procedure.

Fifth Machining Example

Figure 12:
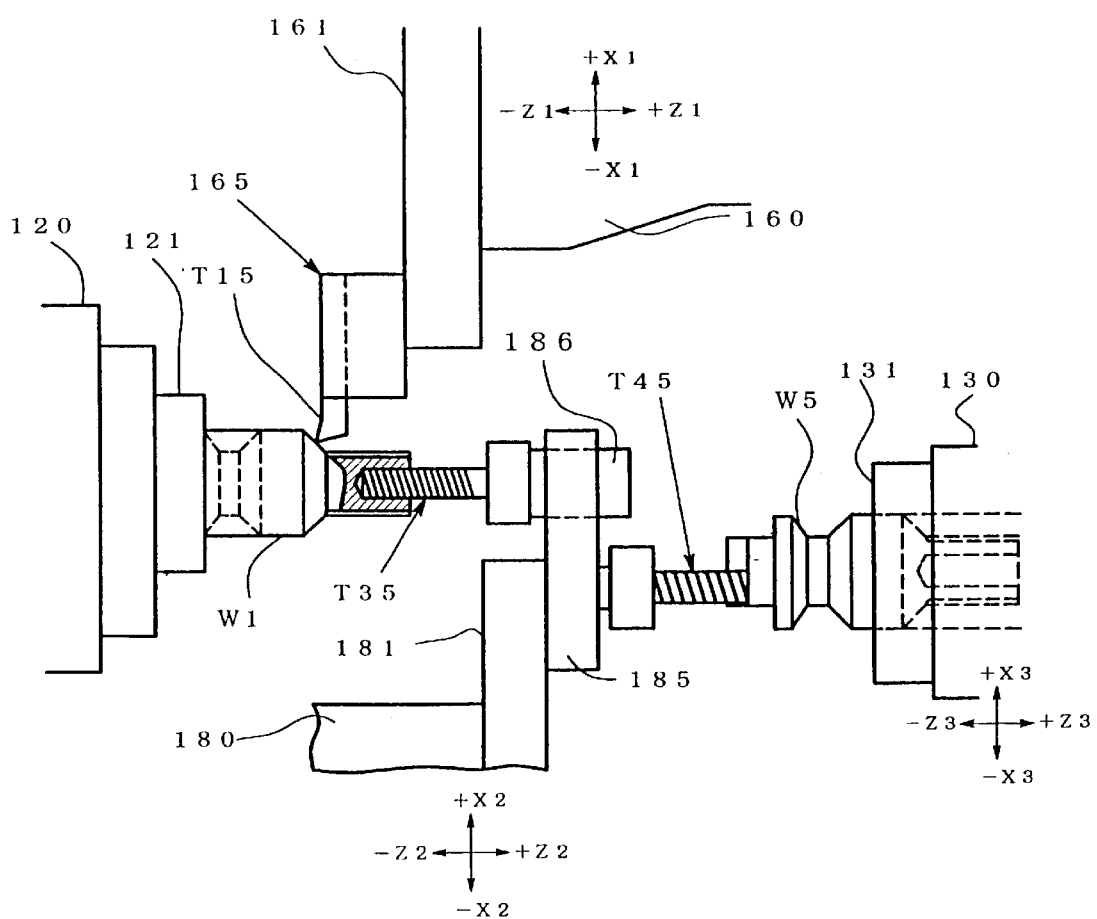
FIG. 12 concerns a still further embodiment of the cutting method according to the present invention and is a schematic view showing a fifth machining example thereof.
Figure 13:
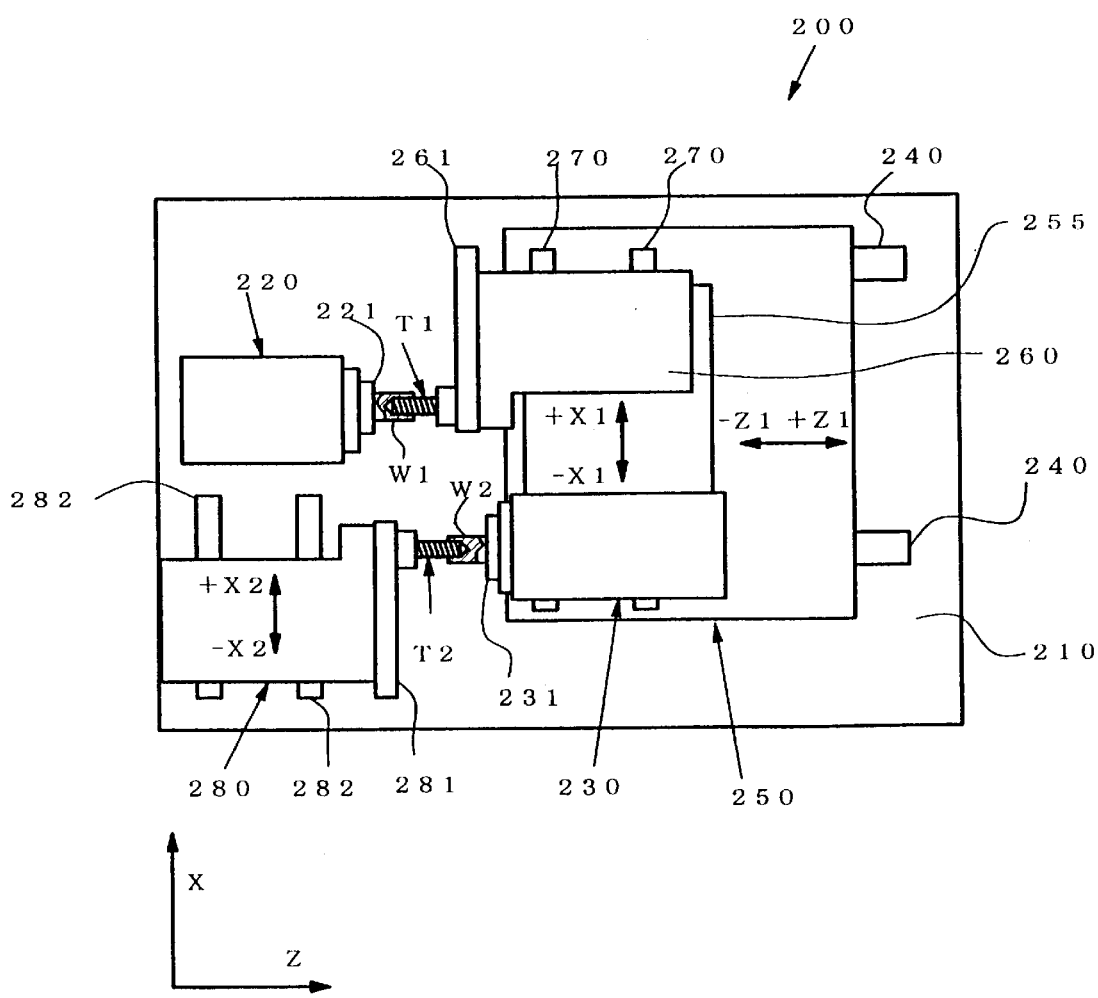
FIG. 13 is a plane view for illustrating a schematic structure of an NC lathe according to a prior art of this invention.

FIG. 12 shows a fifth machining example.

A cutting tool T15 used to machine the outer surface of the workpiece W1 is attached to the first tool rest 160, and a drill device with a rotary mechanism T35 used to drill the workpiece W1 and an end mill T45 which is rotated by a rotary drive mechanism including a motor provided on the turret face plate 181 and machines a workpiece W5 are attached to the second tool rest 180 in parallel with the Z2 axis.

The cutting tool T15 is positioned with respect to the workpiece W1 by moving the first tool rest 160 in the direction of the X1 axis and the direction of the Z1 axis. At the same time, the drill device with a rotary mechanism T35 and the end mill T45 are positioned between the workpiece W1 and the workpiece W5 by moving the second tool rest 180 in the direction of the X2 axis and the direction of the Z2 axis. Then, the drill device with a rotary mechanism T35 is caused to face the end surface of the workpiece W1, and the end mill T45 is caused to face the end surface of the workpiece W5.

In this state, the workpiece W1 is machined by using the cutting tool T15 and the drive device with a rotary mechanism T35 while moving the first tool rest 160 in the direction of the X1 axis and the direction of the Z1 axis and moving the second tool rest 180 in the direction of the Z2 axis.

At the same time, with the second main shaft 131 being positioned at a predetermined rotation angle position without being rotated, groove machining is applied to the workpiece W5 by using the end mill T45 by superposing movement of the second head stock 130 in the direction of the Z3 axis on movement of the second tool rest 180 in the direction of the Z2 axis and moving it in the direction of the X3 axis.

In this machining example, the axes to be superposed are the Z2 axis and the Z3 axis. Therefore, the workpieces W1 and W2 can be simultaneously machined by utilizing the procedure of superposition described in connection with FIGS. 5 to 7.

As described above, in the present invention, outside surface cutting processing, drilling processing and groove formation processing can be simultaneously applied to the two workpieces W1 and W5 by using the three tools, i.e., the cutting tool T15, the drill device with a rotary mechanism T35 and the end mill T45.

Although the preferred embodiments according to the present invention have been described, the present invention is not restricted to the foregoing embodiments.

For example, although many examples have been described as the machining examples, according to the NC lathe of the present invention, since movement control of the first tool rest and the second tool rest with respect to the workpieces grasped by the first main shaft and the second main shaft is enabled without distinctions of the tool rests, the tools attached to the both tool rests can be fully utilized in the machining operation. Therefore, besides machining disclosed above, various kinds of machining can be performed.

According to the present invention, since more kinds of machining than the prior art can be simultaneously performed with respect to the workpieces grasped by the two main shafts, a price of the numerically controlled lathe and a machining cost of a workpiece on the numerically controlled lathe can be greatly reduced.

Industrial Applicability

Machining using the numerically controlled lathe according to the present invention can be applied to groove formation machining using an end mill or threading using a tap as well as cutting or drilling by attaching rotary tools to the tool rests.

What is claimed is:

1. A numerically controlled lathe having: a first head stock and a second head stock arranged so as to be opposed to each other; a first main shaft supported by the first head stock and a second main shaft supported by the second head stock; a tool rest including tools used to machine workpieces grasped by the first main shaft and the second main shaft; and a numerical control device which controls rotation of the first main shaft, rotation of the second main shaft and relative movement of the tool rest with respect to the first head stock or the second head stock, the numerically controlled lathe comprising:
a first tool rest to which one or both a first tool used to machine the workpiece grasped by the first main shaft and a second tool used to machine the workpiece grasped by the second main shaft can be attached and which can move in the direction of a Z1 axis parallel to a main shaft axial line of the first main shaft and the direction of an X1 axis orthogonal to the Z1 axis without restraint;
a second head stock which can move in the direction of an X3 axis parallel to the X1 axis of the first tool rest and the direction of a Z3 axis parallel to the Z1 axis without restraint;
a second tool rest to which one or both of a third tool used to machine the workpiece grasped by the first main shaft and a fourth tool used to machine the workpiece grasped by the second main shaft can be attached and which can move in the direction of a Z2 axis parallel to a main shaft axial line of the first main shaft and the direction of an X2 axis orthogonal to the Z2 axis without restraint; and
a control device which includes a first control system which controls movement of the fist tool rest in the direction of the X1 axis and movement of the same in the direction of the Z1 axis, a second control system which controls movement of the second head stock in the direction of the X3 axis and movement of the same in the direction of the Z3 axis, and a third control system which controls movement of the second tool rest in the direction of the X2 axis and movement of the same in the direction of the Z2 axis, the first control system, the second control system and the third control system performing superposition control of movement of a pair of the X1 axis and the X3 axis, superposition control of movement of a pair of the X3 axis and the X2 axis, superposition control of movement of a pair of the Z1 axis and the Z3 axis and superposition control of movement of a pair of the Z3 axis and the Z2 axis in accordance with each combination of three tools in the tools T1 to T4 used to machine the workpiece W1 and the workpiece W2.

2. A method of cutting a workpiece on the numerically controlled lathe defined in claim 1, comprising the steps of:
attaching one or both of a first tool used to machine a workpiece grasped by the first main shaft and a second tool used to machine a workpiece grasped by the second main shaft to the first tool rest;
attaching one or both of a third tool used to machine the workpiece grasped by the first main shaft and a fourth tool used to machine the workpiece grasped by the second main shaft to the second tool rest;
superposing movement of the second head stock in the direction of the X3 axis or the direction of the Z3 axis on movement of the first tool rest in the direction of the X1 axis or movement of the same in the Z1 axis when the first tool and the second tool are attached to the first tool rest and the third tool is attached to the second tool rest;
superposing movement of the second head stock in the direction of the X3 axis or the direction of the Z3 axis on movement of the second tool rest in the direction of the X2 axis and movement of the same in the direction of the Z2 axis when the first tool is attached to the first tool rest and the third tool and the fourth tool are attached to the second tool rest; and simultaneously machining the workpieces grasped by the first head stock and the second head stock by using the tools attached to the first tool rest and the second tool rest.

3. A method of cutting a workpiece on the numerically controlled lathe defined in claim 1, comprising the steps of:

enabling attachment to the first tool rest one or both of a first tool used to machine a workpiece grasped by the first main shaft and a second tool used to machine a workpiece grasped by the second main shaft;

enabling attachment to the second tool rest one or both of a third tool used to machine the workpiece grasped by the first main shaft and a fourth tool used to machine the workpiece grasped by the second main shaft;

superposing movement of the second head stock in the direction of the X3 axis or the direction of the Z3 axis on movement of the first tool rest in the direction of the X1 axis and movement of the same in the direction of the Z1 axis and superposing movement of the second tool rest in the direction of the X2 axis or the direction of the Z2 axis on movement of the second head stock in the direction of the X3 axis and movement of the same in the direction of the Z3 axis when the first tool and the second tool are attached to the first tool rest and the fourth tool is attached to the second tool rest;

superposing movement of the second head stock in the direction of the X3 axis and the direction of the Z3 axis on movement of the second tool rest in the direction of the X2 axis and movement of the same in the direction of the Z2 axis and superposing movement of the first tool rest in the direction of the X1 axis or the direction of the Z1 axis on movement of the second head stock in the direction of the X3 axis or movement of the same in the direction of the Z3 axis when the second tool is attached to the first tool rest and the third tool and the fourth tool are attached to the second tool rest; and simultaneously machining the workpieces grasped by the first head stock and the second head stock by using the tools attached to the first tool rest and the second tool rest.

4. The method of cutting a workpiece on the numerically controlled lathe according to claim 2, wherein at least one of the first tool and the second tool attached to the first tool rest and the third tool and the fourth tool attached to the second tool rest is used to machine an end surface of the workpiece.

5. The method of cutting a workpiece on the numerically controlled lathe according to claim 2, wherein a procedure to perform at least one of superposition of a pair of the X1 axis and the X3 axis, superposition of a pair of the X2 axis and the X3 axis, superposition of a pair of the Z1 axis and the Z3 axis and superposition of a pair of the Z2 axis and the Z3 axis is previously defined and macro-programmed, and superposition is carried out by executing the macro-program when a command to perform superposition of a pair of the X1 axis and the X3 axis, superposition of a pair of the X2 axis and the X3 axis, superposition of a pair of the Z1 axis and the Z3 axis or superposition of a pair of the Z2 axis and the Z3 axis is inputted.

6. The method of cutting a workpiece on the numerically controlled lathe according to claim 2, wherein a judgment is made upon whether the second head stock interferes with any other member when machining the workpiece by using the second tool attached to the first tool rest, machining of the workpiece by using the second tool is executed when it is determined that there is no interference, and machining of the workpiece is executed by using the fourth tool attached to the second tool rest in place of the second tool when it is determined that there is interference.

7. The method of cutting a workpiece on the numerically controlled lathe according to claim 2, wherein a judgment is made upon whether the second tool rest interferes with any other component when machining the workpiece by using the fourth tool attached to the second tool rest, machining of the workpiece by using the fourth tool is executed when it is determined that there is no interference, and machining of the workpiece is executed by using the second tool attached to the first tool rest in place of the fourth tool when it is determined that there is interference.

* * * * *